United States Patent
Brown et al.

(10) Patent No.: US 6,622,131 B1
(45) Date of Patent: Sep. 16, 2003

(54) METHOD AND SYSTEM FOR AUCTIONING LOANS THROUGH A COMPUTING SYSTEM

(75) Inventors: Christopher C. Brown, Spicewood, TX (US); Cole W. Lowenfield, Austin, TX (US)

(73) Assignee: rateGenius, Inc., Austin, TX (US)

( * ) Notice: Subject to any disclaimer, the term of this patent is extended or adjusted under 35 U.S.C. 154(b) by 0 days.

(21) Appl. No.: 09/471,879

(22) Filed: Dec. 23, 1999

(51) Int. Cl.[7] ............................................... G06F 17/60
(52) U.S. Cl. ............................................. 705/38; 705/1
(58) Field of Search ............................... 705/38, 23, 1, 705/37, 35

(56) References Cited

U.S. PATENT DOCUMENTS

| | | | |
|---|---|---|---|
| 5,794,207 A | * 8/1998 | Walker et al. | 705/23 |
| 5,940,812 A | * 8/1999 | Tengel et al. | 705/38 |
| 5,966,699 A | * 10/1999 | Zandi | 705/38 |
| 6,385,594 B1 | 5/2002 | Lebda et al. | |

FOREIGN PATENT DOCUMENTS

| EP | WO 99/59084 | * 11/1999 | 705/38 |
|---|---|---|---|
| WO | WO 02/31727 A1 | 4/2002 | |

OTHER PUBLICATIONS

Businerss Wire article entitled "Chase Joins the Lending Tree Network, Network Expands to More than30 Lenders to Meet Growing Needs; Consumer Demand Tops $2.2 Billion in Feb. Alone", Mar. 30, 1999.*

* cited by examiner

Primary Examiner—Richard Chilcot
(74) Attorney, Agent, or Firm—Michael A. Davis, Jr.; Haynes and Boone, L L P

(57) ABSTRACT

A computing device receives first information about a customer. The computing device outputs second information to at least first and second loan sources. The second information includes at least a portion of the first information. From the first and second loan sources, the computing device receives submissions of respective first and second bids for providing a loan to the customer for purchase of an item. The computing device identifies at least one of the first and second bids as being most favorable. To the customer, the computing device outputs third information about the identified bid, including an identity of at least one of the loan sources that submitted the identified bid.

28 Claims, 23 Drawing Sheets

Fig. 3b application – Netscape

_300_

Just fill out the easy online
application below and you're on
your way to savings!

306

Application

| | First | Last |
|---|---|---|
| Your Name | John | Doe |

| | | Apt. # |
|---|---|---|
| Street Address | 123 Easy Street | |

| | | | |
|---|---|---|---|
| City | Austin | State | Texas |

| | | |
|---|---|---|
| ZIP Code | 78787 | |

Social Security # 987-65-4321

E-Mail Jdoe@nobody.com

308 → Continue   ← 302

Telephone Number 512-555-8458

Driver's License Number 87654321

State Texas

*Fig. 3c*

Your Loan Amount   Your Loan Rate   Your Loan Term

[NaN] ← 302         [    ]          [36 ▼] months

[Compute savings]

New Rate            Monthly Payment  Total Savings
[    ]              [    ]           [    ]

310 ↙

- Mileage of Automobile
- Manufacturer of Automobile
- Model of Automobile
- Vehicle Identification Number
- State of Registration
- License Plate Number
- Original Loan Source
- Name of Lender
- City of Lender
- Original Seller of Automobile
- Name of Seller
- City of Seller
- Purchase Price of Automobile
- Month and Year of Purchase
- Name of Insurance Company

METHOD AND SYSTEM FOR AUCTIONING LOANS THROUGH A COMPUTING SYSTEM

BACKGROUND

The disclosures herein relate in general to information processing systems and in particular to a method and system for auctioning loans through a computing system.

If a customer is seeking a loan for purchase of an item (e.g. automobile), the customer may want to obtain a lowest available loan rate of interest, as for example by auctioning the loan to numerous loan sources (e.g. banks). Various websites (e.g. http://www.ebay.com) have been implemented for auctioning of items through the Internet. However, such websites have been implemented primarily for auctioning of the items themselves, as contrasted with auctioning of loans for purchase of the items.

Before auctioning a loan through a website, the customer may want assurance that such website attracts a higher number of loan sources to submit bids. By including features directed specifically to the auctioning of loans, a website is more likely to attract: (a) a higher number of loan sources to submit bids, thereby achieving convenience, efficiency and reliability for the customer; and (b) likewise a higher number of customers, who seek a more convenient, efficient and reliable "one stop" system for such auctioning.

Some websites (e.g. http://www.priceline.com, http://www.eloan.com, and http://www.lendingtree.com) have been implemented for selling loans through the Internet. However, those websites have various shortcomings, because they fail to address a number of customer preferences.

For example, in auctioning a loan, the customer may prefer to remain anonymous to numerous loan sources, especially if the loan sources would otherwise (a) request, from credit bureaus, reviews of the customer's credit history, and/or (b) inundate the customer with uninvited correspondence and personal solicitation. If numerous loan sources request (from credit bureaus) reviews of the customer's credit history, then unreasonable damage (such as a negative "Beacon" score consequence) might be inflicted on the customer's credit history as a result of such reviews.

Notably, in auctioning a loan, the customer may prefer to be the offeree of a bid, as contrasted with being the offeror of the bid. For example, if a loan source submits a bid, the customer may prefer to reject such bid without obligation or financial penalty. Moreover, the customer may want the loan sources to submit respective bids without knowing a loan rate of interest that would be acceptable to the customer, thereby increasing the likelihood of more favorable bids.

Also, the customer may prefer to auction the loan to hundreds, or perhaps thousands, of loan sources. For that reason, if a website permits only a restricted few loan sources to effectively submit bids for providing a loan to a particular customer, such a restriction would be a significant shortcoming.

A more convenient, efficient and reliable system for auctioning loans would be particularly valuable in the context of automobile purchases. For example, in many cases, a customer receives an original loan for purchase of an automobile at higher-than-market rates of interest, sometimes through the automobile dealer who then profits from the original loan. Accordingly, the customer may seek a more convenient, efficient and reliable system for auctioning the refinancing of such a loan.

Accordingly, a need has arisen for a method and system for auctioning loans through a computing system, in which various shortcomings of previous techniques are overcome. For example, a need has arisen for a method and system for auctioning loans through a computing system, in which: (a) features are directed specifically to the auctioning of loans; (b) a higher number of customer preferences are addressed; and (c) the customer may more conveniently, efficiently and reliably auction the refinancing of a loan.

SUMMARY

One embodiment, accordingly, provides for a system, including a computing device for receiving first information about a customer. The computing device outputs second information to at least first and second loan sources. The second information includes at least a portion of the first information. From the first and second loan sources, the computing device receives submissions of respective first and second bids for providing a loan to the customer for purchase of an item. The computing device identifies at least one of the first and second bids as being most favorable. To the customer, the computing device outputs third information about the identified bid, including an identity of at least one of the loan sources that submitted the identified bid.

In another embodiment, first information includes an identity of the customer. In response to the first information, the computing device determines a measure of certainty regarding the customer's ability to repay a loan. To at least one loan source, the computing device outputs second information, including at least a portion of the first information and the measure of certainty regarding the customer's ability to repay the loan, yet withholding the customer's identity. From the loan source, the computing device receives a submission of a bid for providing the loan to the customer for purchase of an automobile which is security for the loan. To the customer, the computing device outputs third information about the bid, including an identity of the loan source.

A principal advantage of these embodiments is that various shortcomings of previous techniques are overcome. For example, a principal advantage of these embodiments is that: (a) features are directed specifically to the auctioning of loans; (b) a higher number of customer preferences are addressed; and (c) the customer may more conveniently, efficiently and reliably auction the refinancing of a loan.

BRIEF DESCRIPTION OF THE DRAWING

FIG. 3b is an illustration of a 2nd screen displayed by a display device of a customer of the system of FIG. 1.

FIG. 3c is an illustration of a 3rd screen displayed by a display device of a customer of the system of FIG. 1.

FIG. 3d is an illustration of a 4th screen displayed by a display device of a customer of the system of FIG. 1.

FIG. 3e is an illustration of a 5th screen displayed by a display device of a customer of the system of FIG. 1.

FIG. 3f is an illustration of a 6th screen displayed by a display device of a customer of the system of FIG. 1.

FIG. 7 (i.e.

FIG. 9 (i.e. FIGS. 9a–c) is a flowchart of operation of a bank process of FIG. 5.

DETAILED DESCRIPTION

Figure 1:
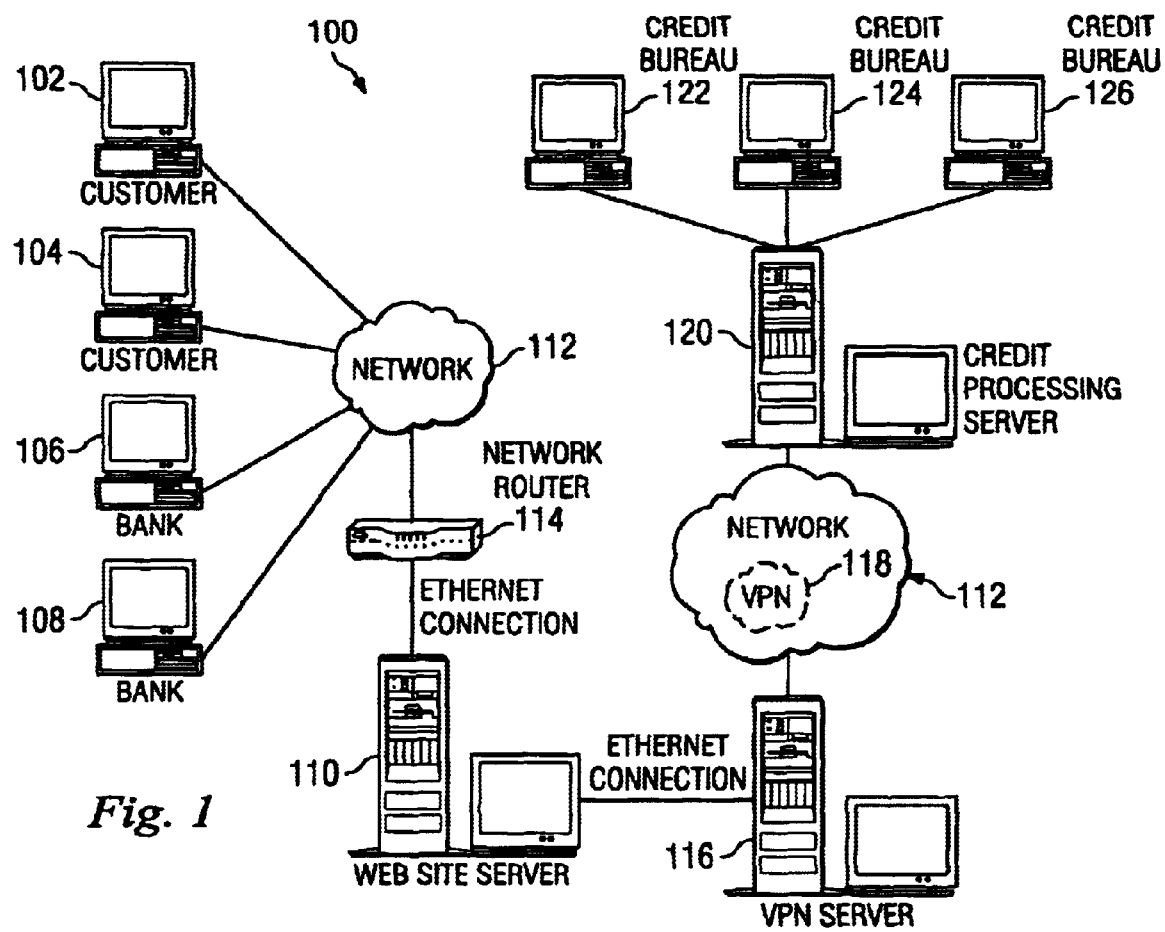
FIG. 1 is a block diagram of a system for auctioning loans according to the illustrative embodiment.

FIG. 1 is a block diagram of a system, indicated generally at 100, for auctioning loans according to the illustrative embodiment. Advantageously, system 100 includes features directed specifically to the auctioning of loans. Such features are discussed further hereinbelow.

As shown in FIG. 1, system 100 includes (a) customers 102 and 104, each for executing a respective customer process as discussed further hereinbelow in connection with FIGS. 3a–h, (b) banks (or "loan sources" or "lending entities" or "financial institutions") 106 and 108, each for executing a respective bank process as discussed further hereinbelow in connection with FIGS. 4a–g, and (c) a website server 110 for executing a website process as discussed further hereinbelow in connection with FIGS. 3a–h, 4a–g, and 5. Further, system 100 includes (a) a global computer network 112, such as a Transport Control Protocol/Internet Protocol ("TCP/IP") network 112 (e.g. the Internet or an intranet), and (b) a network router 114.

Each of customers 102 and 104, banks 106 and 108, and website server 110 includes a respective network interface for communicating with network 112 (i.e. outputting information to, and receiving information from, network 112), such as by transferring information (e.g. instructions, data, signals) between such customer (or bank or website server) and network 112. Accordingly, through network 112, website server 110 communicates with customers 102 and 104 and banks 106 and 108, and vice versa. Network router 114 manages such communications (through network 112) between website server 110 and each of customers 102 and 104 and banks 106 and 108, such that website server 110 is coupled through network router 114 and network 112 to each of customers 102 and 104 and banks 106 and 108. As shown in FIG. 1, website server 110 and network router 114 communicate with one another through a conventional "ethernet" connection.

Also, as shown in FIG. 1, system 100 includes a virtual private network ("VPN") server 116. Each of website server 110 and VPN server 116 includes a respective network interface for communicating with one another (e.g. transferring information to and from one another) through a conventional "ethernet" connection.

Further, system 100 includes (a) an VPN portion 118 of network 112, (b) a credit processing server 120, and (c) credit bureaus 122, 124 and 126, each for executing a respective credit bureau process as discussed further hereinbelow in connection with FIGS. 3a–h, 4a–g, and 6. Each of credit processing server 120, and credit bureaus 122, 124 and 126, includes a respective network interface for communicating with one another through a conventional medium, such as a TCP/IP network (e.g. network 112) or an "ethernet" connection. Also, each of VPN server 116 and credit processing server 120 includes a respective network interface for communicating with one another through VPN portion 118 of network 112, according to a Transport Layer Security ("TLS") protocol.

Accordingly, VPN server 116 manages communications (through VPN portion 118 of network 112) between website server 110 and credit processing server 120, such that website server 110 is coupled through VPN server 116 and VPN portion 118 of network 112 to credit processing server 120. Credit processing server 120 manages communications (through VPN portion 118 of network 112) between VPN server 116 and credit bureaus 122, 124 and 126, such that VPN server 116 is coupled through credit processing server 120 to credit bureaus 122, 124 and 126.

For clarity, FIG. 1 depicts only two customers 102 and 104, although system 100 may include additional customers which are substantially identical to one another. Similarly, for clarity, FIG. 1 depicts only two banks 106 and 108, although system 100 may include additional banks which are substantially identical to one another. Also, for clarity, FIG. 1 depicts only three credit bureaus 122, 124 and 126, although system 100 may include additional credit bureaus which are substantially identical to one another. For explanatory purposes, customer 102 is a representative one of the customers, bank 106 is a representative one of the banks, and credit bureau 122 is a representative one of the credit bureaus.

Each of customers 102 and 104, banks 106 and 108, website server 110, network 112, VPN server 116, credit processing server 120, and credit bureaus 122, 124 and 126 is a computing system that includes at least one respective computing device (e.g. computer) for executing a respective process and performing respective operations (e.g. processing and communicating information) in response thereto as discussed further hereinbelow. Each such computing system and computing device is formed by various electronic circuitry components. Moreover, as shown in FIG. 1, all such computing systems and computing devices are coupled to one another.

In the illustrative embodiment, the computing devices of customers 102 and 104, and of banks 106 and 108, are personal computers (e.g. IBM-compatible personal computers ("PCs")) that execute Microsoft Windows operating system ("OS") software. Also, in the illustrative embodiment, the computing devices of website server 110, network 112, VPN server 116, credit processing server 120, and of credit bureaus 122, 124 and 126, are server computers that execute Microsoft Windows NT OS software. Alternatively, any one or more of the computing devices of system 100 is any type of computer that executes any type of OS. All Microsoft products identified herein are available from Microsoft Corporation, One Microsoft Way, Redmond, Wash. 98052-6399, telephone (425) 882-8080.

Figure 2:
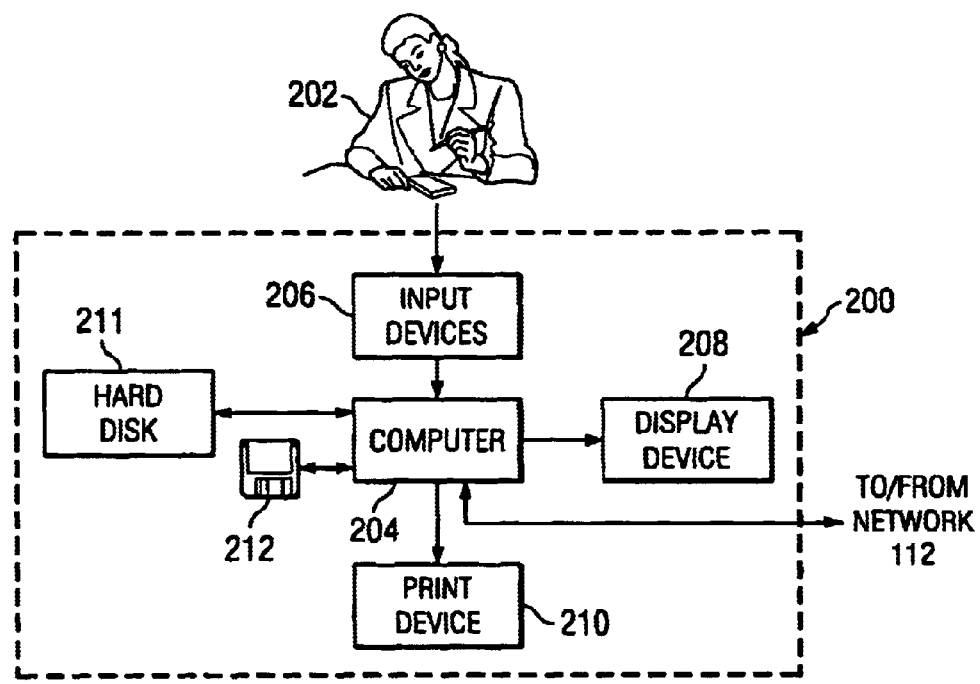
FIG. 2 is a block diagram of a representative one of the computing systems of the system of FIG. 1.

FIG. 2 is a block diagram of a representative one of the computing systems of system 100. Such representative computing system is indicated by dashed enclosure 200. Each of the computing systems of system 100 operates in association with a respective human user. Accordingly, in the example of FIG. 2, computing system 200 operates in association with a human user 202, as discussed further hereinbelow.

As shown in FIG. 2, computing system 200 includes (a) input devices 206 for receiving information from human user 202, (b) a display device 208 (e.g. a conventional electronic cathode ray tube ("CRT") device) for displaying information to user 202, (c) a computer 204 for executing and otherwise processing instructions, (d) a print device 210 (e.g. a conventional electronic printer or plotter), (e) a nonvolatile storage device 211 (e.g. a hard disk drive or other computer-readable medium (or apparatus), as discussed further hereinbelow) for storing information, (f) a computer-readable medium (or apparatus) 212 (e.g. a portable floppy diskette) for storing information, and (g) various other electronic circuitry for performing other operations of computing system 200.

For example, computer 204 includes (a) a network interface (e.g. circuitry) for communicating between computer 204 and network 112 and (b) a memory device (e.g. random access memory ("RAM") device and read only memory ("ROM") device) for storing information (e.g. instructions executed by computer 204 and data operated upon by computer 204 in response to such instructions). Accordingly, computer 204 is connected to network 112, input devices 206, display device 208, print device 210, storage device 211, and computer-readable medium 212, as shown in FIG. 2.

For example, in response to signals from computer 204, display device 208 displays visual images, and user 202 views such visual images. Moreover, user 202 operates input devices 206 in order to output information to computer 204, and computer 204 receives such information from input devices 206. Also, in response to signals from computer 204, print device 210 prints visual images on paper, and user 202 views such visual images.

Input devices 206 include, for example, a conventional electronic keyboard and a pointing device such as a conventional electronic "mouse", rollerball or light pen. User 202 operates the keyboard to output alphanumeric text information to computer 204, and computer 204 receives such alphanumeric text information from the keyboard. User 202 operates the pointing device to output cursor-control information to computer 204, and computer 204 receives such cursor-control information from the pointing device.

Figure 3A:
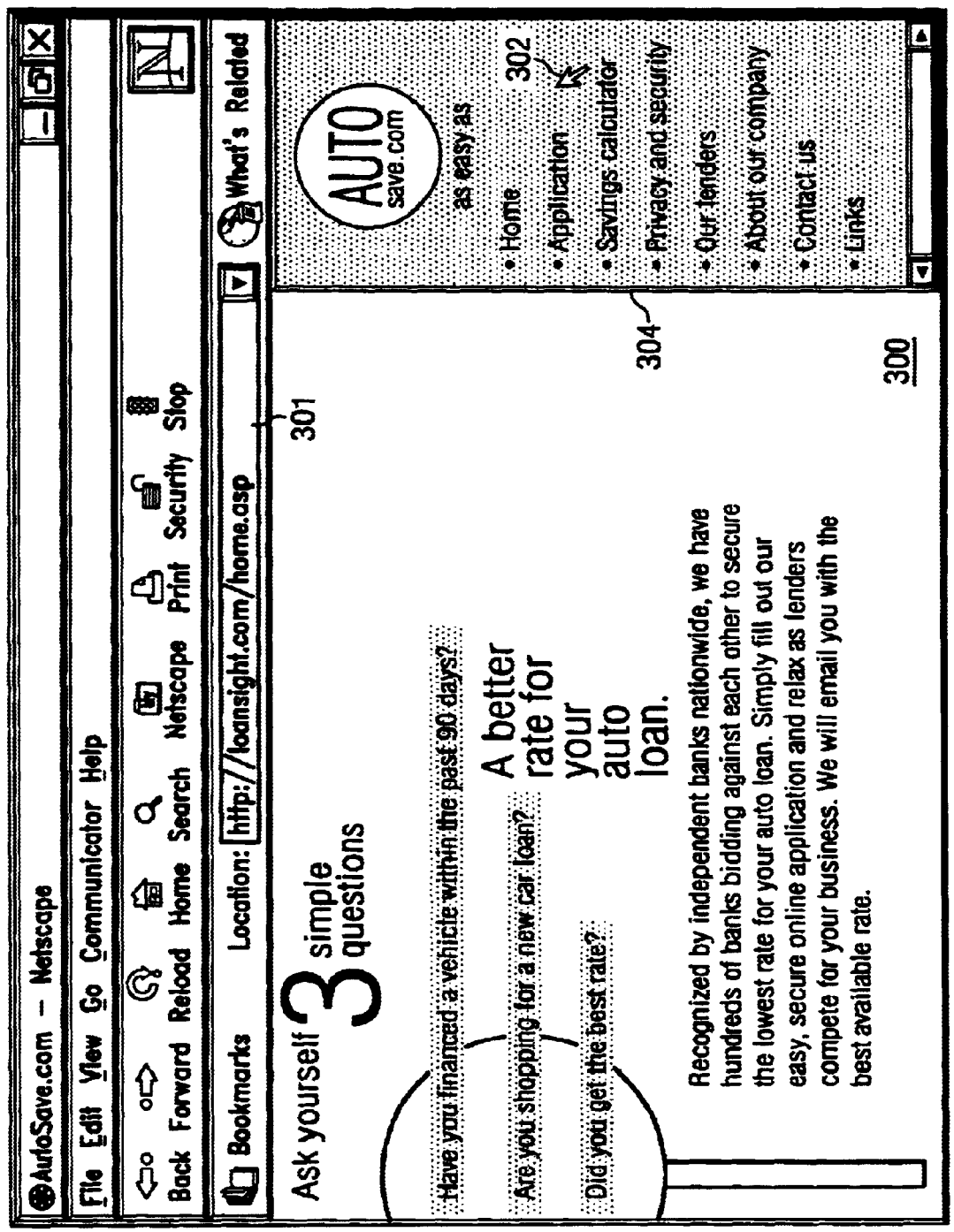
FIG. 3a is an illustration of a 1st screen displayed by a display device of a customer of the system of FIG. 1.

FIG. 3a is an illustration of a visual image (or "screen"), indicated generally at 300, displayed by a display device (such as display device 208) of a customer (such as customer 102) of system 100. Likewise, FIGS. 3b–h are illustrations of other screens 300 displayed by the customer's display device. Similarly, FIGS. 4a–g are illustrations of screens, indicated generally at 400, displayed by a display device (such as display device 208) of a bank (such as bank 106) of system 100.

Figure 5:
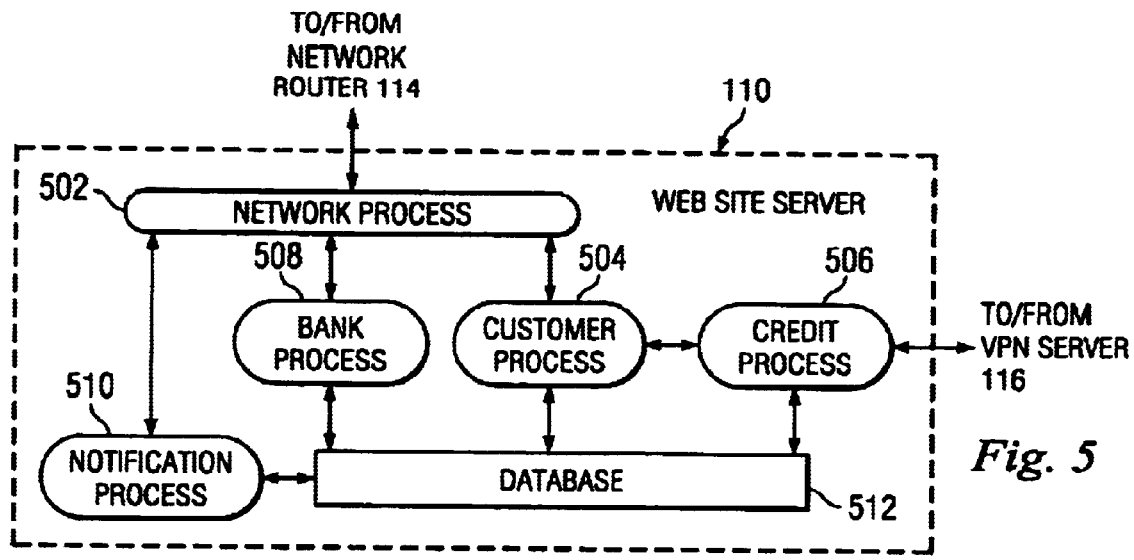
FIG. 5 is a conceptual illustration of various processes executed by a website server of the system of FIG. 1.

FIG. 5 is a conceptual illustration of various processes executed by website server 110. The processes shown in FIG. 5 are illustrative, and not exhaustive, of the processes executed by website server 110. As shown in FIG. 5, website server 110 executes a network process 502 (discussed further hereinbelow in connection with FIG. 6), a customer process 504 (discussed further hereinbelow in connection with FIG. 7), a credit process 506 (also discussed further hereinbelow in connection with FIG. 7), a bank process 508 (discussed further hereinbelow in connection with FIG. 9), and a notification process 510 (discussed further hereinbelow in connection with FIG. 10). FIG. 5 further illustrates a database 512 on the hard disk of website server 110.

As discussed further hereinbelow in connection with FIG. 6, network process 502 manages communications between network router 114 and each of customer, bank and notification processes 504, 508 and 510. Also, as discussed further hereinbelow in connection with FIG. 7, credit process 506 manages communications between VPN server 116 and customer process 504, and between VPN server 116 and database 512. Each of processes 504, 506, 508 and 510 (a) writes information for storage in database 512 and (b) reads information that has been previously stored in database 512.

Figure 6:
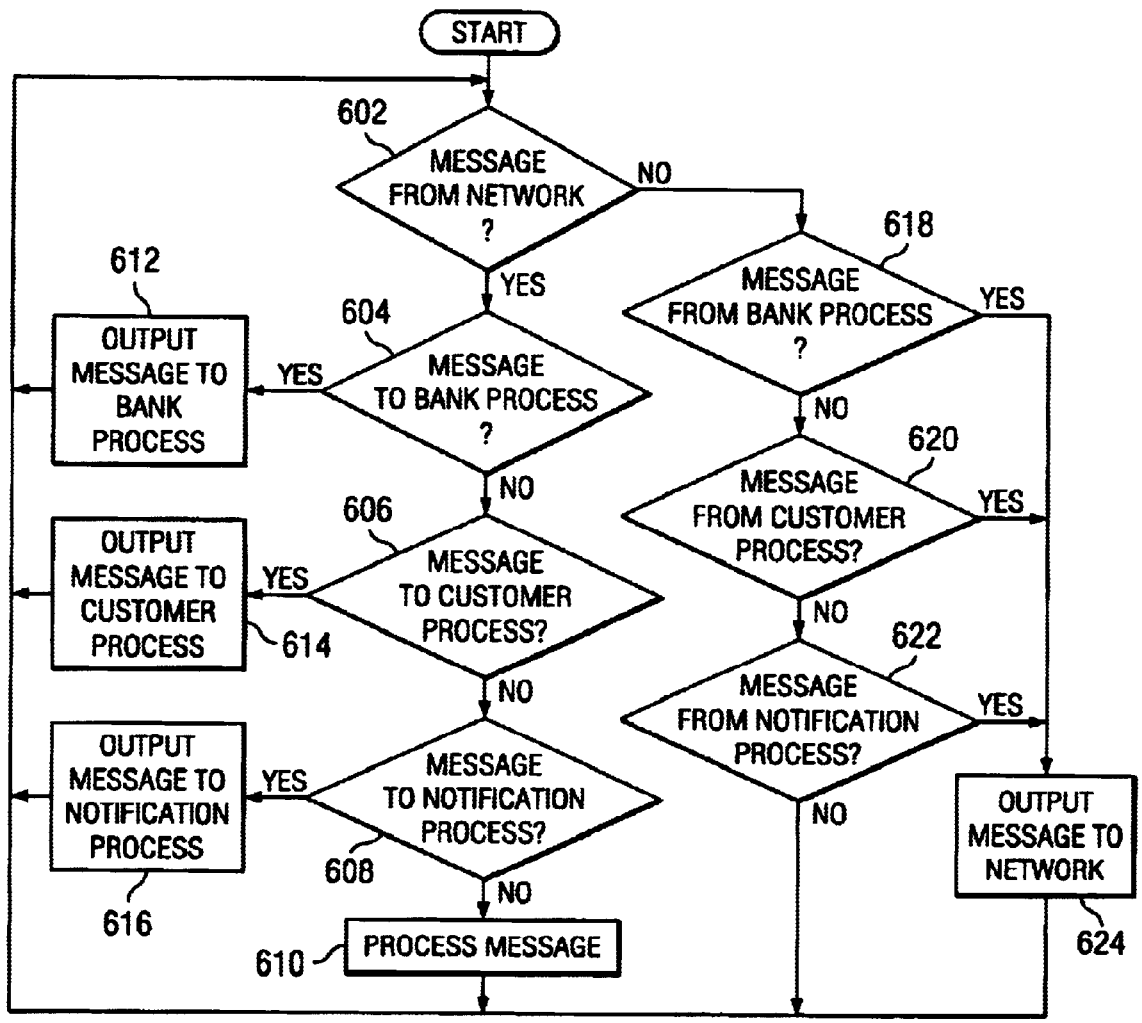
FIG. 6 is a flowchart of operation of a network process of FIG. 5.

FIG. 6 is a flowchart of operation of network process 502, and FIG. 6 shows the sequence and interrelation of such operation's various steps. The operation begins at a step 602 where website server 110 determines whether it has received a new message from network 112.

If so, website server 110 determines (a) at a step 604, whether the message is destined for bank process 508, (b) at a step 606, whether the message is destined for customer process 504, and (c) at a step 608, whether the message is destined for notification process 510.

If website server 110 determines that the message is destined for none of processes 504, 508 and 510, the operation continues to a step 610 where website server 110 otherwise processes the message. After step 610, the operation returns to step 602.

At step 604, if website server 110 determines that the message is destined for bank process 508, the operation continues to a step 612. At step 612, website server 110 outputs the message to bank process 508. After step 612, the operation returns to step 602.

At step 606, if website server 110 determines that the message is destined for customer process 504, the operation continues to a step 614. At step 614, website server 110 outputs the message to customer process 504. After step 614, the operation returns to step 602.

At step 608, if website server 110 determines that the message is destined for notification process 510, the operation continues to a step 616. At step 616, website server 110 outputs the message to notification process 510. After step 616, the operation returns to step 602.

At step 602, if website server 110 determines that it has not received a new message from network 112, the operation continues to (a) a step 618, where website server 110 determines whether it has received a new message from bank process 508, (b) a step 620, where website server 110 determines whether it has received a new message from customer process 504, and (c) a step 622, where website server 110 determines whether it has received a new message from notification process 510.

If website server 110 determines (at any one or more of steps 618, 620 or 622) that it has received a new message (from any one or more of processes 508, 504 or 510), the operation continues to a step 624. At step 624, website server 110 outputs the new message to network 112. After step 624, the operation returns to step 602. Also, if website server 110 determines (at steps 618, 620 or 622) that it has not received a new message (from any of processes 508, 504 or 510), the operation returns to step 602.

Figure 7A:
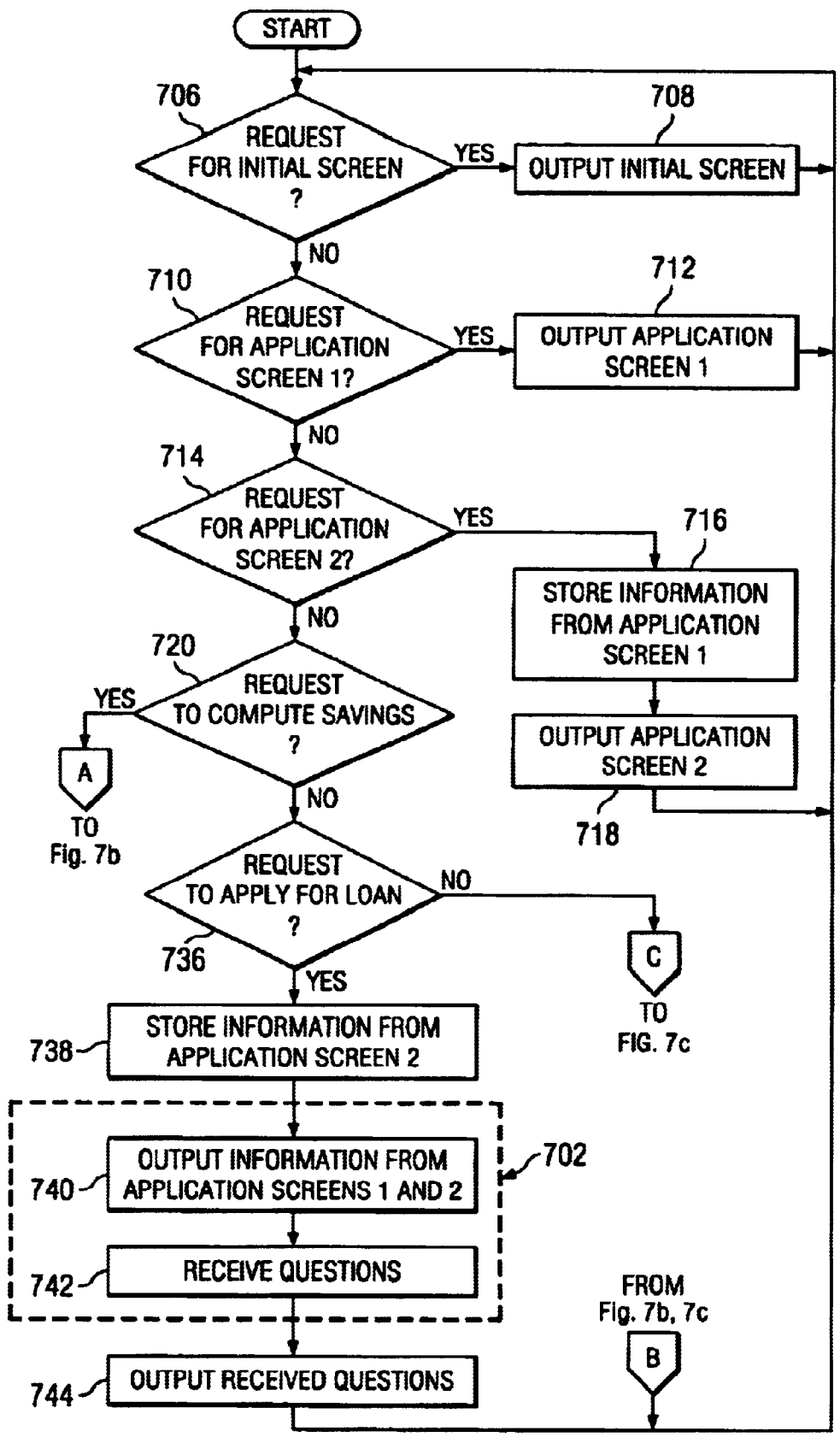
FIGS. 7a–c) is a flowchart of operation of a customer process and a credit process of FIG. 5.
Figures 7B, 7C:
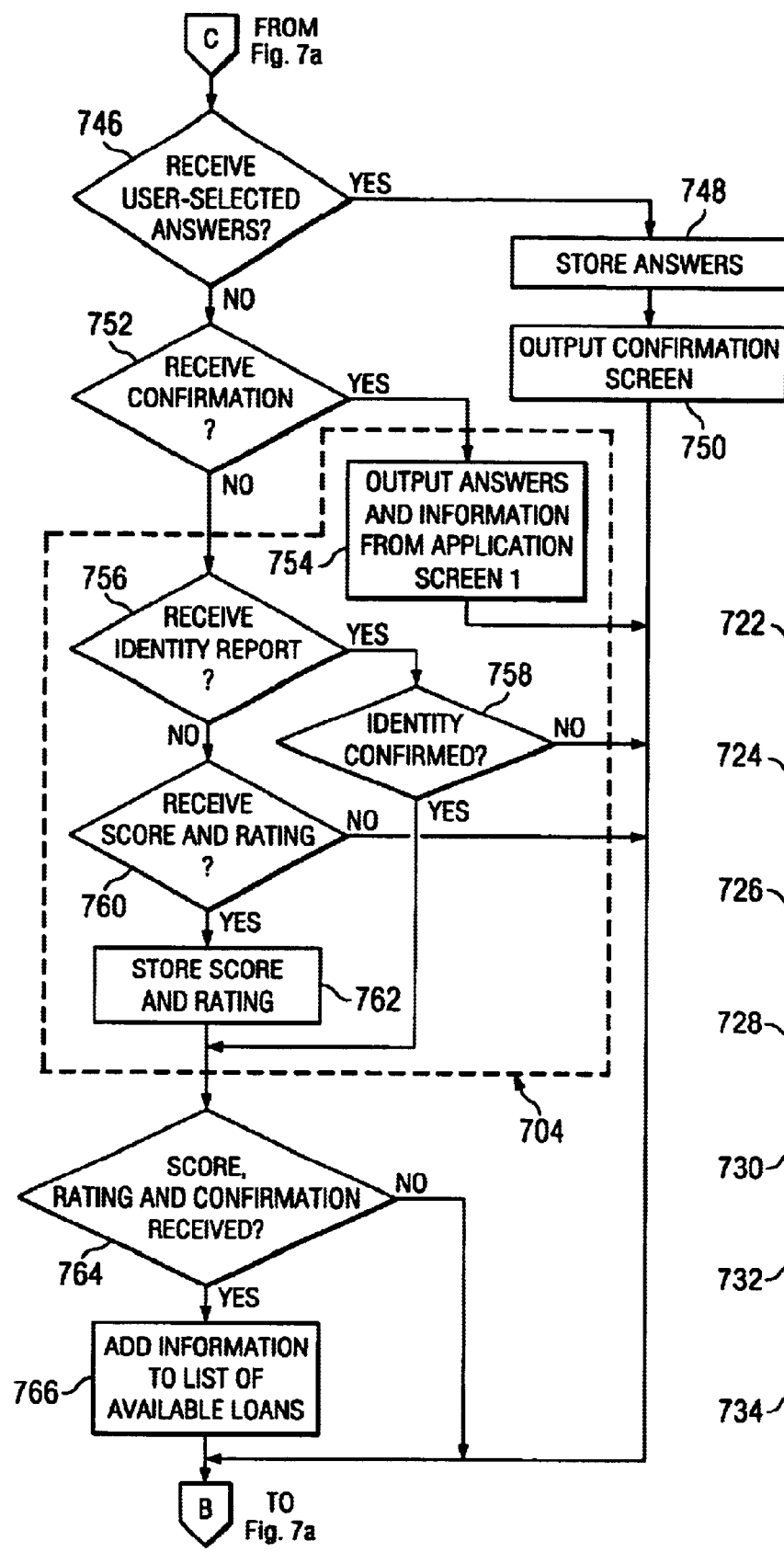

FIG. 7 is a flowchart of operation of customer process 504 and credit process 506, and FIG. 7 shows the sequence and interrelation of such operation's various steps. More particularly, credit process 506 includes the steps indicated by dashed enclosures 702 and 704, and customer process 504 includes the remaining steps of FIG. 7. The following description references FIG. 7, simultaneously with FIGS. 3a–h.

As indicated in FIG. 3a, the customer's computer (such as computer 204) executes browser software, such as (a) Netscape Navigator software available from Netscape Communications Corporation, 501 E. Middlefield Road, Mountain View, Calif. 94043, telephone (650) 254-1900 or (b) alternatively, Microsoft Internet Explorer software.

Screen 300 includes a Uniform Resource Locator ("URL") field 301, which is a region of screen 300 in which the customer's user (such as user 202) is able to specify a URL address. In FIG. 3a, the user-specified URL address is http://loansight.com/home.asp, which defines the route to a file on website server 110 (which is a global computer network facility). The customer's user specifies the URL address by selecting URL field 301 and specifying alphanumeric character information of the URL address for display within URL field 301.

For example, the customer's user selects URL field 301 by (a) operating the customer's pointing device (such as the pointing device of input devices 206) to position a cursor 302 overlapping with URL field 301 and (b) after so positioning cursor 302, activating a switch of the customer's pointing device. Such selection of a region (such as URL field 301) of screen 300 by the customer's user is hereinafter referred to as the customer's user "clicking" such region.

After clicking (or "selecting") URL field 301, the customer's user is able to specify alphanumeric character information of the URL address for display within URL field 301. For example, the customer's user specifies such information by operating the customer's electronic keyboard (such as the electronic keyboard of input devices 206), so that screen 300 displays such information within the selected field (such as URL field 301). Such operation of the customer's electronic keyboard by the customer's user is hereinafter referred to as the customer's user "typing" such information.

After the customer's user specifies the URL address, the user is able to cause the customer's computer to output (or "transmit") the URL address to network 112, as for example by pressing an "Enter" key of the customer's electronic keyboard. In response to such transmission of the URL address, network 112 communicates with website server 110 through network router 114. At a step 706, website server 110 detects such communication (which is a request for initial screen 300 of FIG. 3a). In response thereto, at a step 708, website server 110 outputs signals (such as HyperText Markup Language ("HTML") commands or EXtensible Markup Language ("XML") commands) to the customer's computer.

Accordingly, through network 112 and network router 114, the customer's computer receives such signals from website server 110. In response thereto, the customer's computer outputs signals to the customer's display device, so that the customer's display device displays initial screen 300 of FIG. 3a.

As shown in FIG. 3a, screen 300 includes a set of "buttons" indicated generally at 304, which are regions of screen 300. Each button of screen 300 (e.g. each of buttons 304) is individually clickable by the customer's user. Buttons 304 include an "Application" button. In response to the customer's user clicking the "Application" button, as shown in FIG. 3a, the customer's computer outputs at least one signal, resulting in a display of screen 300 of FIG. 3b by the customer's display device.

In one example, the customer's computer outputs such signal (which is a request for application screen 300 of FIG. 3b) to website server 110. In such example, at a step 710, website server 110 detects such signal. In response thereto, at a step 712, website server 110 outputs additional signals to the customer's computer, resulting in the display of screen 300 of FIG. 3b by the customer's display device.

Figure 3B:
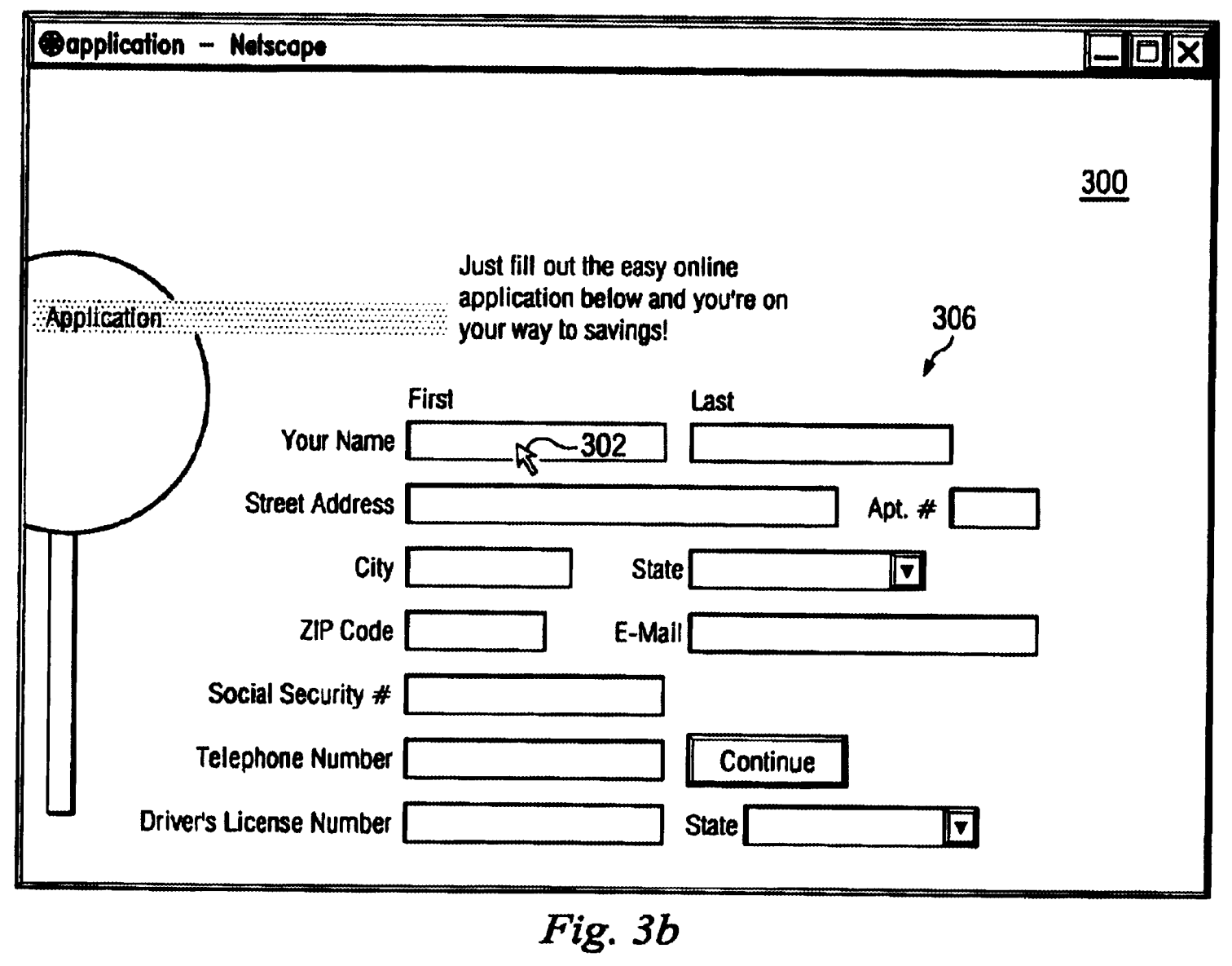

Accordingly, referring to FIG. 3b, screen 300 includes a set of fields indicated generally at 306. As shown in FIG. 3b, fields 306 are regions of screen 300 in which the customer's user is able to specify alphanumeric character information, similar to the example of FIG. 3a hereinabove in which the customer's user specified alphanumeric character information of the URL address for display within URL field 301. More particularly, in fields 306, the customer's user is able to specify information about the user (e.g. the owner of an automobile), such as the user's (a) first name, (b) last name, (c) street address, (d) apartment number (if any), (e) city, (f) state, (g) ZIP code, (h) e-mail address, (i) social security number, (j) telephone number, (k) driver's license number, and (l) driver's license state.

FIG. 3c is an illustration of screen 300 after the customer's user has specified information for display within fields 306. In response to the customer's user clicking a "Continue" button 308, as shown in FIG. 3c, the customer's computer outputs the user-specified information (of fields 306) to website server 110. At a step 714, website server 110 detects such user-specified information. In response to receiving the user-specified information, website server 110 (a) at a step 716, stores it (in database 512), and (b) at a step 718, outputs additional signals to the customer's computer, resulting in the display of screen 300 of FIG. 3d by the customer's display device.

Accordingly, referring to FIG. 3d, screen 300 includes a set of fields indicated generally at 310. As shown in FIG. 3d, fields 310 are regions of screen 300 in which the customer's user is able to specify information about an automobile (or other vehicle, or physical or intangible object or item) owned by the user, such as (a) mileage, (b) manufacturer, (c) model, (d) vehicle identification number, (e) state of registration, (f) license plate number, (g) name of the original lender (or "loan source") who provided the user's original loan for purchase of the automobile, (h) city of such lender, (i) name of the original seller from whom the user purchased the automobile, (j) city of such seller, (k) purchase price, (l) month of purchase, (m) year of purchase, and (n) name of the insurance company who insures the automobile. Such automobile-specific information is potentially relevant to a lender in entering a secured transaction (i.e. a transaction in which the automobile is used as security or collateral for a loan), in which the lender provides the loan to the user for financing purchase of the automobile (or refinancing such a loan).

Also, as shown in FIG. 3d, screen 300 includes a savings calculator indicated generally at 312. Savings calculator 312 includes a set of fields, which are regions of screen 300 in which the customer's user is able to specify additional information about the user's original loan (received by the user for purchase of the automobile), such as (a) loan amount, (b) loan rate of interest, and (c) term (i.e. length of loan repayment period).

Figure 3E:
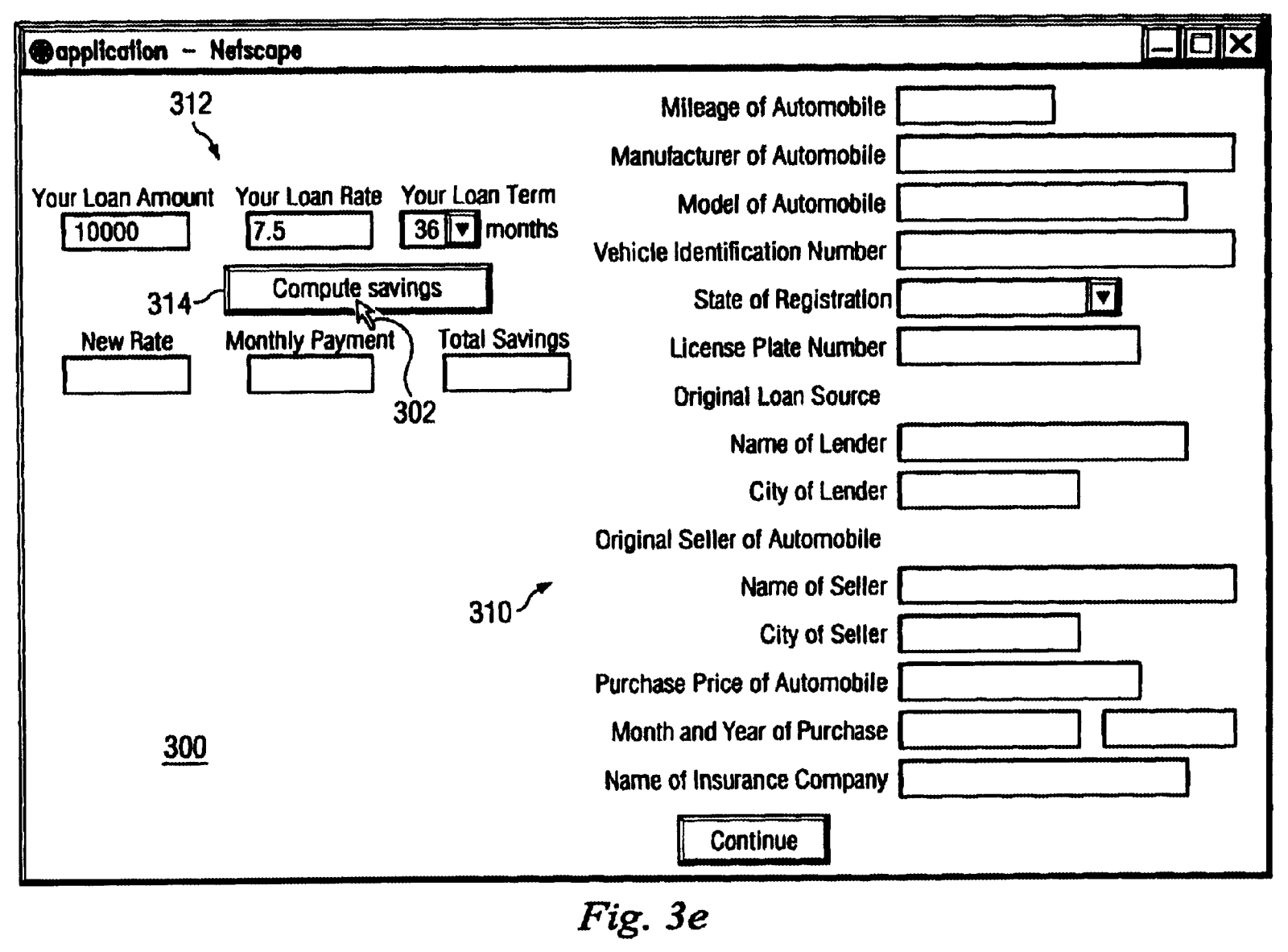

FIG. 3e is an illustration of screen 300 after the customer's user has specified information for the fields of savings calculator 312. In response to the customer's user clicking a "Compute savings" button 314, as shown in FIG. 3e, the customer's computer outputs the user-specified information to website server 110. At a step 720, website server 110 detects such user-specified information. In response to receiving the user-specified information, website server 110 (a) at a step 722, stores it (in database 512), (b) at a step 724, computes the user's current monthly payment in response to the user-specified loan rate and the user-specified term, (c) at a step 726, determines a lowest available new loan rate of interest, (d) at a step 728, computes a new monthly payment in response to the new loan rate and to the user-specified term, (e) at a step 730, computes the monthly difference between the new monthly payment and the user's current monthly payment, (f) at a step 732, computes a total savings by multiplying the monthly difference by the number of months in the user-specified term, and (g) at a step 734, outputs additional signals (e.g. including the new loan rate, the new monthly payment, and the total savings) to the customer's computer, resulting in the display of screen 300 of FIG. 3f by the customer's display device.

Figure 3F:
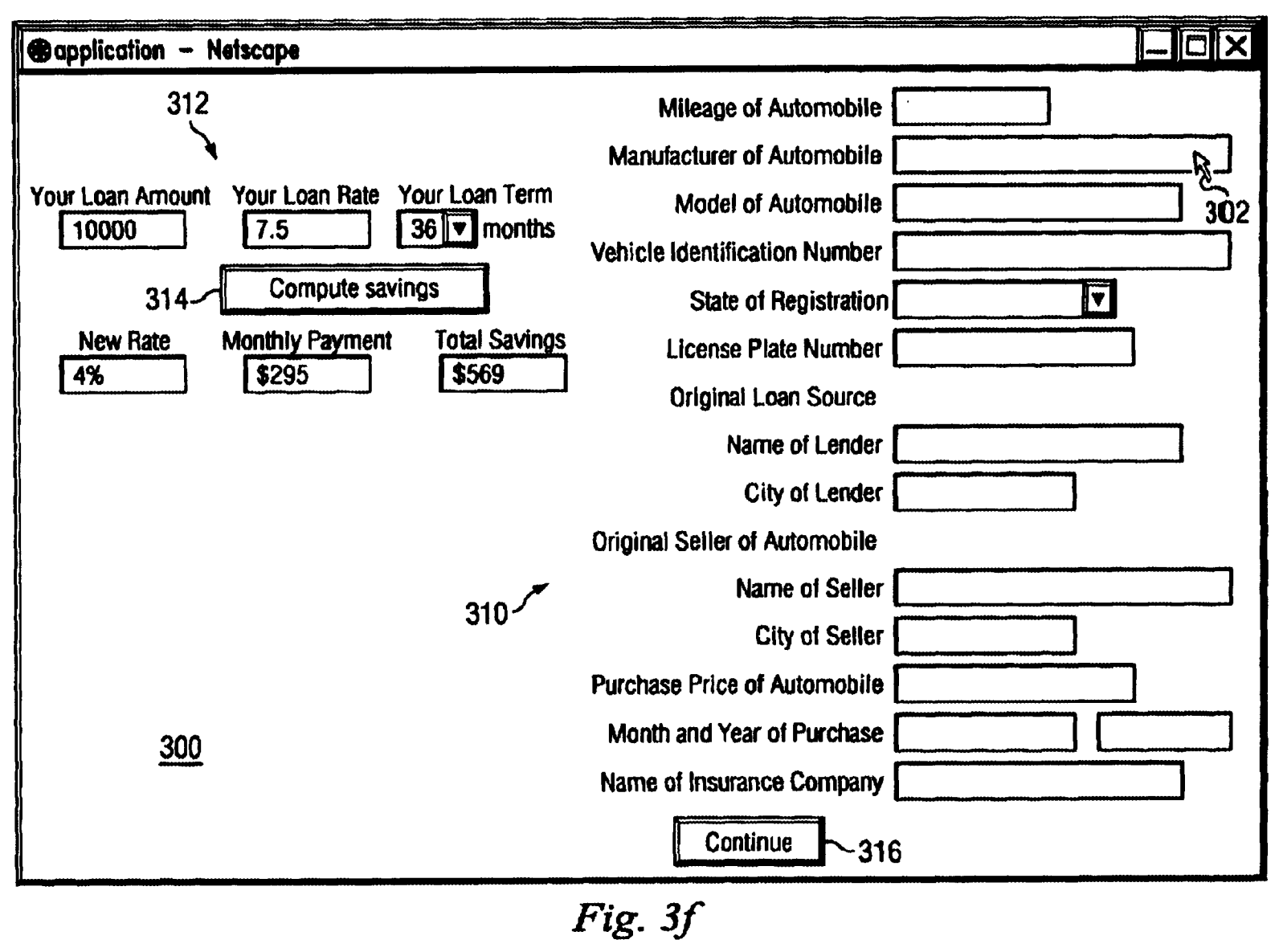

Accordingly, referring to FIG. 3f, savings calculator 312 includes a display of the new loan rate (4%), the new monthly payment ($295), and the total savings ($569), which the customer's computer receives from website server 110. In that manner, the customer's user is able to view the potential magnitude of savings resulting from continued use of system 100. In response to such viewing, the customer's user is motivated to specify information for display within each of fields 310.

After specifying information for display within each of fields 310 and the fields of savings calculator 312, the customer's user is able to click a "Continue" button 316. In response to the user clicking "Continue" button 316, the customer's computer outputs the user-specified information (of fields 310) to website server 110. At a step 736, website server 110 detects such user-specified information. In response to receiving the user-specified information, website server 110 (a) at a step 738, stores it (in database 512), and (b) at a step 740, outputs it to credit processing server 120, together with the previously stored (as discussed hereinabove in connection with FIG. 3c) user-specified information (of fields 306).

In one embodiment, website server 110 performs such storage and output (and performs the remaining operation discussed further hereinbelow) only if the customer's user (a) is a resident of the United States or Canada, (b) purchased the user's automobile less than one year ago, and (c) obtained an original loan rate of interest (for purchase of the automobile) higher than the lowest available new loan rate of interest. Website server 110 outputs such user-specified information to credit processing server 120 through VPN server 116 and VPN portion 118 of network 112.

Figure 8:
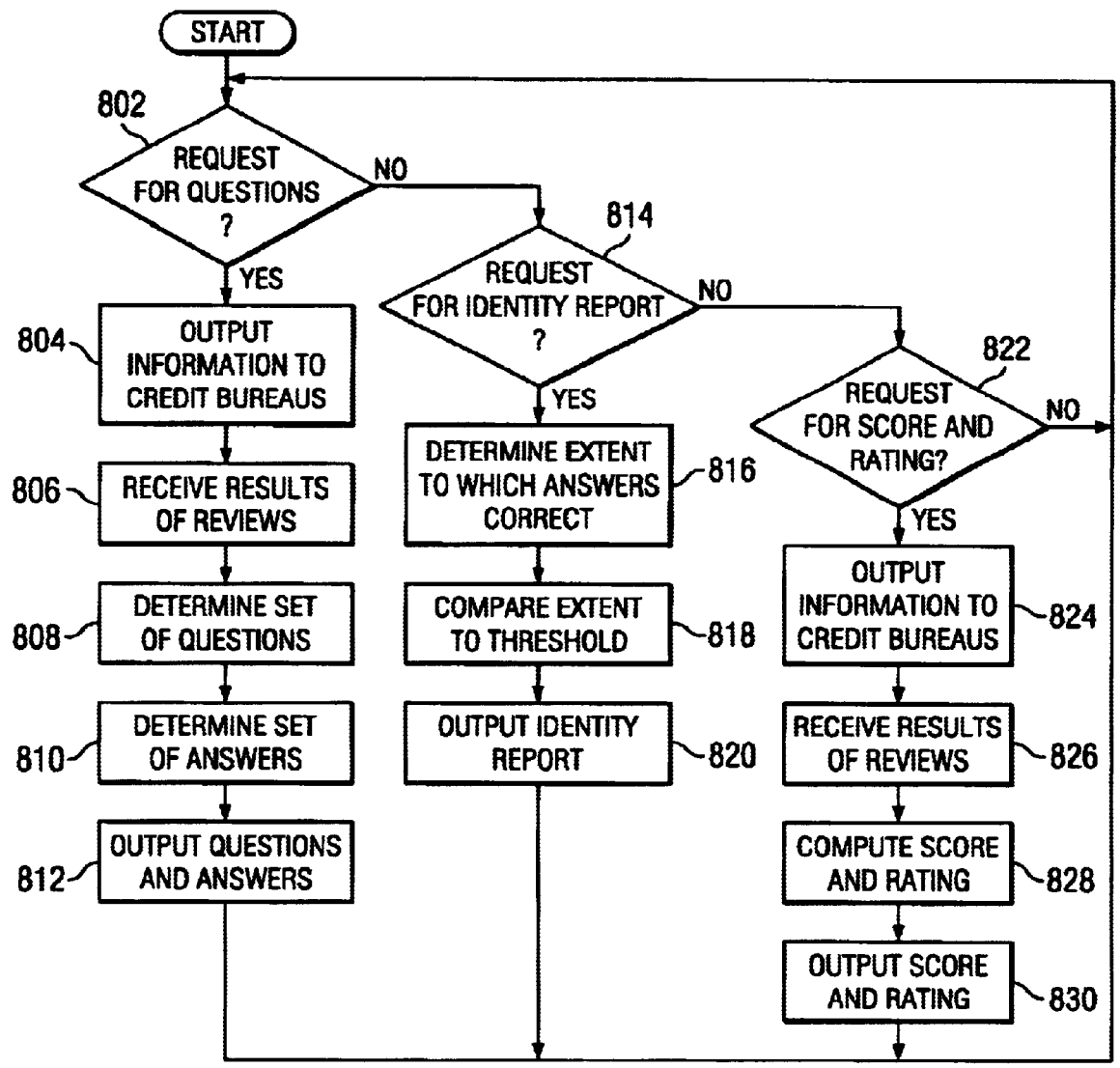
FIG. 8 is a flowchart of operation of a credit processing server of the system of FIG. 1.

FIG. 8 is a flowchart of operation of credit processing server 120, and FIG. 8 shows the sequence and interrelation of such operation's various steps. At a step 802, credit processing server 120 detects the user-specified information (from step 740), which is a request for questions. In response to receiving such user-specified information, credit processing server 120 stores it (on a hard disk of credit processing server 120) and outputs signals (e.g. including the user-specified information) to credit bureaus 122, 124 and 126 at a step 804. In response to such signals, each of credit bureaus 122, 124 and 126 (a) performs a respective review of various aspects of the user's history, with reference to a database stored on the credit bureau's hard disk, and (b) outputs detailed results of such review to credit processing server 120.

At a step 806, credit processing server 120 detects and receives such results from credit bureaus 122, 124 and 126, which are replies to the signals (or "request") of step 804. In response to such results, credit processing server 120 (a) at a step 808, stores them (on a hard disk of credit processing server 120) and determines a set of questions for (or "requests of") the customer's user, in order to confirm (or "verify" or "authenticate") the user's identity in comparison to the user-specified information of FIG. 3c, (b) at a step 810, for each question, determines an associated set of multiple-choice answers, and (c) at a step 812, outputs the set of questions and associated sets of multiple-choice answers to website server 110, which is a reply to the request of step 802. For each question, only one of the associated multiple-choice answers is correct.

Referring again to FIG. 7, at a step 742, website server 110 detects and receives the set of questions and associated sets of multiple-choice answers (of steps 808, 810 and 812). In response to such receipt, website server 110 outputs additional signals to the customer's computer at a step 744, resulting in the display of screen 300 of FIG. 3g by the customer's display device. In an alternative embodiment, credit processing server 120 outputs results of the credit bureaus' reviews to website server 110 and, in response thereto, website server 110 itself determines the set of questions and associated sets of multiple-choice answers.

Figure 3G:
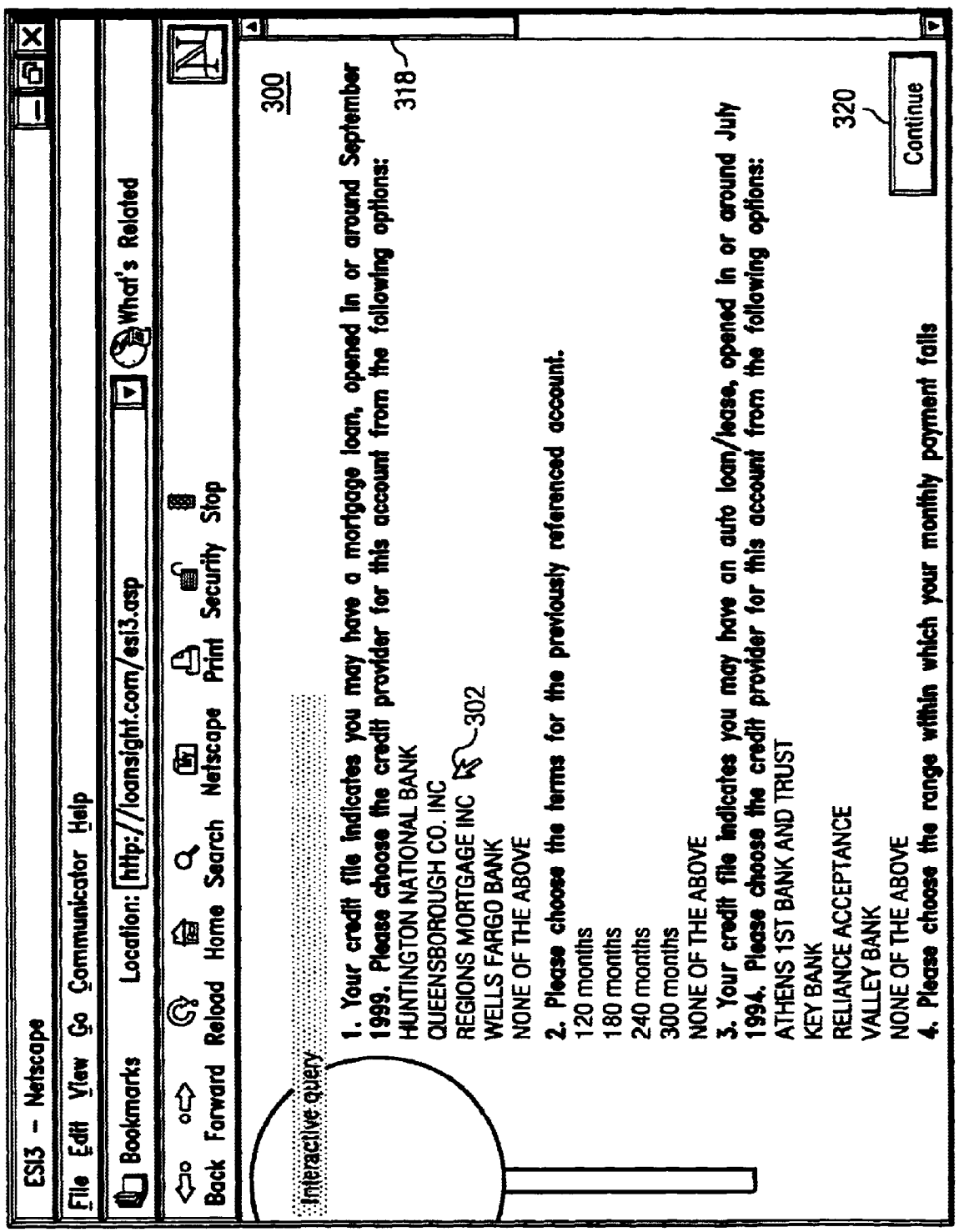
FIG. 3g is an illustration of a 7th screen displayed by a display device of a customer of the system of FIG. 1.

Accordingly, referring to FIG. 3g, screen 300 includes a display of the set of questions and associated sets of multiple-choice answers. For each question, the customer's user is able to select one of the associated multiple-choice answers by clicking the selected answer. The customer's user is able to view all of the questions and multiple-choice answers by (a) clicking a scroll bar 318 and (b) while continuing to activate the switch of the customer's pointing device, operating the customer's pointing device to reposition scroll bar 318 within screen 300.

After selecting one of the associated multiple-choice answers for each question, the customer's user is able to click a "Continue" button 320. In response to the user clicking "Continue" button 320, the customer's computer outputs the user-selected answers to website server 110. At a step 746, website server 110 detects the user-selected answers, which are replies to the set of questions (or "requests") of steps 808, 810 and 812. In response to receiving the user-selected answers, website server 110 (a) at a step 748, stores them (in database 512) and (b) at a step 750, outputs additional signals to the customer's computer, resulting in the display of confirmation screen 300 of FIG. 3h by the customer's display device.

Figure 3H:
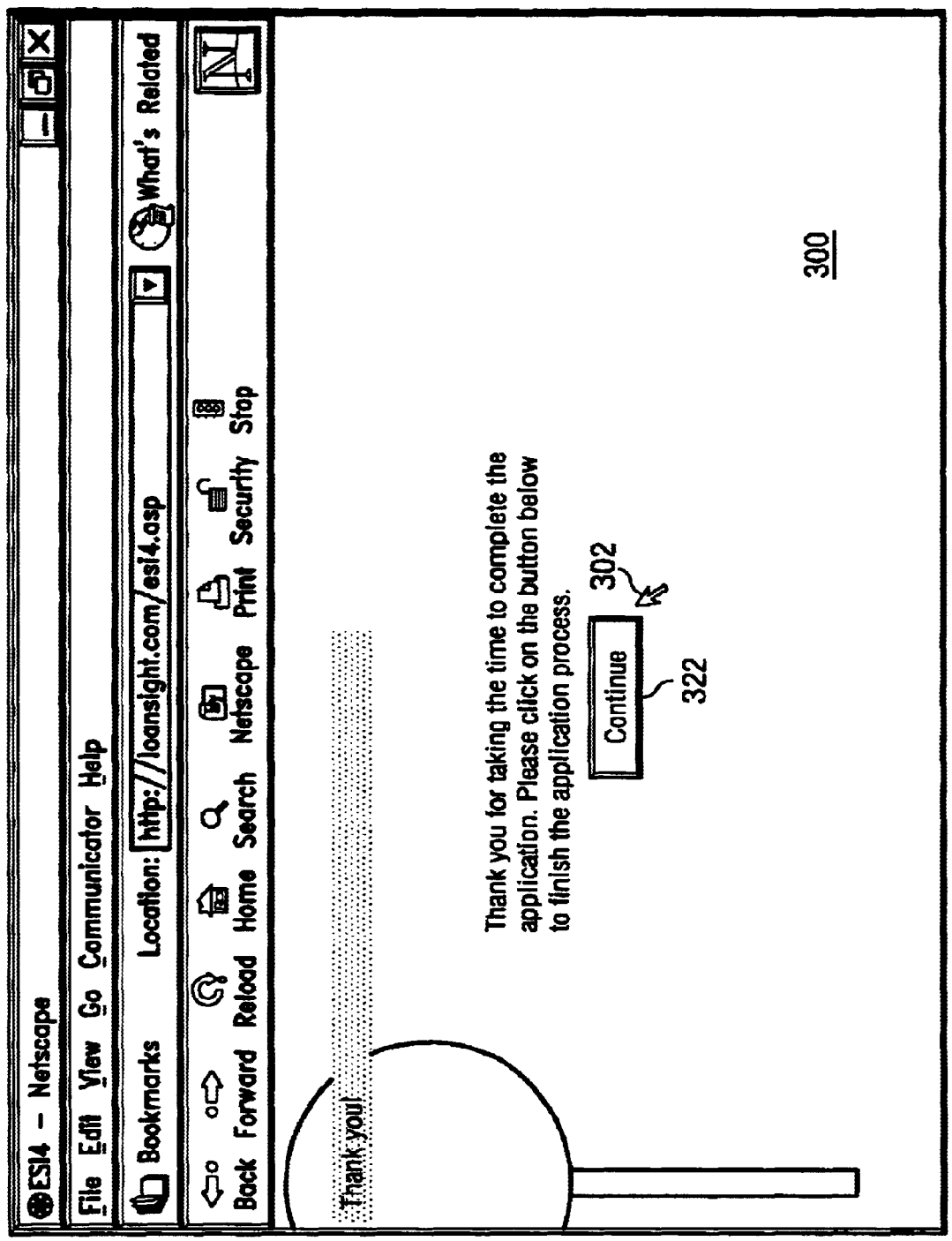
FIG. 3h is an illustration of an 8th screen displayed by a display device of a customer of the system of FIG. 1.

Accordingly, referring to FIG. 3h, confirmation screen 300 displays a message that (a) thanks the customer's user for using system 100 and (b) prompts the customer's user to confirm the user's intent to apply for a new loan. In order to confirm the user's intent, the user is able to click a "Continue" button 322. In response to the user clicking "Continue" button 322, the customer's computer outputs a confirmation signal to website server 110.

At a step 752, website server 110 detects the confirmation signal. In response thereto, at a step 754, website server 110 outputs the following information to credit processing server 120 through VPN server 116 and VPN portion 118 of network 112: (a) the previously stored (as discussed hereinabove in connection with FIG. 3c) user-specified information; and (b) the previously stored (as discussed hereinabove in connection with FIG. 3g) user-selected answers.

Referring again to FIG. 8, at a step 814, credit processing server 112 detects the user-selected answers (from step 754), which is a request for an identity report. In response to receiving the user-selected answers, credit processing server 120 determines at a step 816 the extent to which the answers are correct, thereby determining a measure of certainty regarding the user's identity in comparison to the user-specified information of FIG. 3c. In response to such determination, credit processing server 120: (a) at a step 818, compares such measure to a predetermined threshold and thereby determines whether the identity of the customer's user is confirmed; and (b) at a step 820, outputs an identity report (specifying whether the identity of the customer's user is confirmed) to website server 110, which is a reply to the request of step 814. In an alternative embodiment, website server 110 itself determines the extent to which the user-selected answers are correct and thereby determines whether the identity of the customer's user is confirmed.

Referring again to FIG. 7, at a step 756, website server 110 detects the identity report from credit processing server 120. In response to receiving such identity report, website server 110 determines at a step 758 whether the identity of the customer's user has been confirmed.

Referring again to FIG. 8, at a step 822, website server detects the previously stored (as discussed hereinabove in connection with step 804) user-specified information (from step 740), which is a request for a credit score and a risk rating. In response to receiving the user-specified information, credit processing server 120 outputs signals (e.g. including the user-specified information) to credit bureaus 122, 124 and 126 at a step 824. In response to such signals, each of credit bureaus 122, 124 and 126 (a) performs a respective review of credit aspects of the user's history (i.e. "the user's credit history"), with reference to a database stored on the credit bureau's hard disk, and (b) outputs detailed results of such review to credit processing server 120, which are replies to the signals (or "request") of step 824.

At a step 826, credit processing server 120 detects and receives such results from credit bureaus 122, 124 and 126. In response to receiving such results, credit processing server 120 (a) at a step 828, computes a credit score and a risk rating for the customer's user, and (b) at a step 830, outputs such credit score and risk rating to website server 110, which is a reply to the request of step 822. In an alternative embodiment, credit processing server 120 outputs results of the credit bureaus' reviews to website server 110 and, in response thereto, website server 110 itself computes (or "determines") the credit score and risk rating.

In a significant aspect of the illustrative embodiment, each of credit bureaus 122, 124 and 126 reviews the user's credit history once, as contrasted with once per bank. This is achieved by website server 110 (a) sharing the user's credit score, risk rating, and city/state with the banks (such as banks 106 and 108), and (b) withholding the user's specific identity from each bank until after such bank has submitted (through system 100) the most favorable bid (e.g. from among bids submitted by one or more banks, the bid having the lowest proposed new loan rate of interest for refinancing the user's loan). In that manner, system 100 substantially avoids (a) a temptation for numerous banks to solicit the user's permission for such banks to request (from the credit bureaus) additional reviews of the user's credit history, and (b) the resulting unreasonable damage (such as a negative "Beacon" score consequence) that might be inflicted on the user's credit history as a result of such reviews. Moreover, by withholding the user's specific identity from each bank until after such bank has submitted (through system 100) the most favorable bid, system 100 helps the banks comply with equal opportunity lending requirements (e.g. regulations and laws).

Referring again to FIG. 7, at a step 760, website server 110 detects the credit score and risk rating from credit processing server 120. In response to receiving such credit score and risk rating, website server 110 stores them (in database 512) at a step 762. The credit score and risk rating indicate a measure of certainty regarding the user's ability to repay a loan. Relative to the risk rating, the credit score is more heavily affected by the user's history of repaying loans.

In the illustrative embodiment, the credit score is measured as a number between 0 and 100 (e.g. an integer number), with a higher number indicating a higher measure of certainty. Also, in the illustrative embodiment, the risk rating is measured as a number between 1 and 5 (e.g. displayed as an integer number of "stars" in FIG. 4b), with a higher number indicating a higher measure of certainty. By displaying the risk rating as an integer number of "stars" in FIG. 4b, system 100 classifies each user into a predefined category (i.e. each category is represented by an integer number of "stars"), in order to assist the bank's evaluation of such user.

At a step 764, website server 110 determines whether the identity of the customer's user has been confirmed and whether it has received both the credit score and risk rating from credit processing server 120. If so, website server 110 adds the following information to a list of available loans at a step 766, which is stored by website server 110 in database 512: (a) the credit score, (b) the risk rating, and (c) portions of the previously stored (as discussed hereinabove in connection with FIGS. 3c and 3f) user-specified information, as discussed further hereinbelow in connection with FIGS. 4a–g.

Figure 4A:
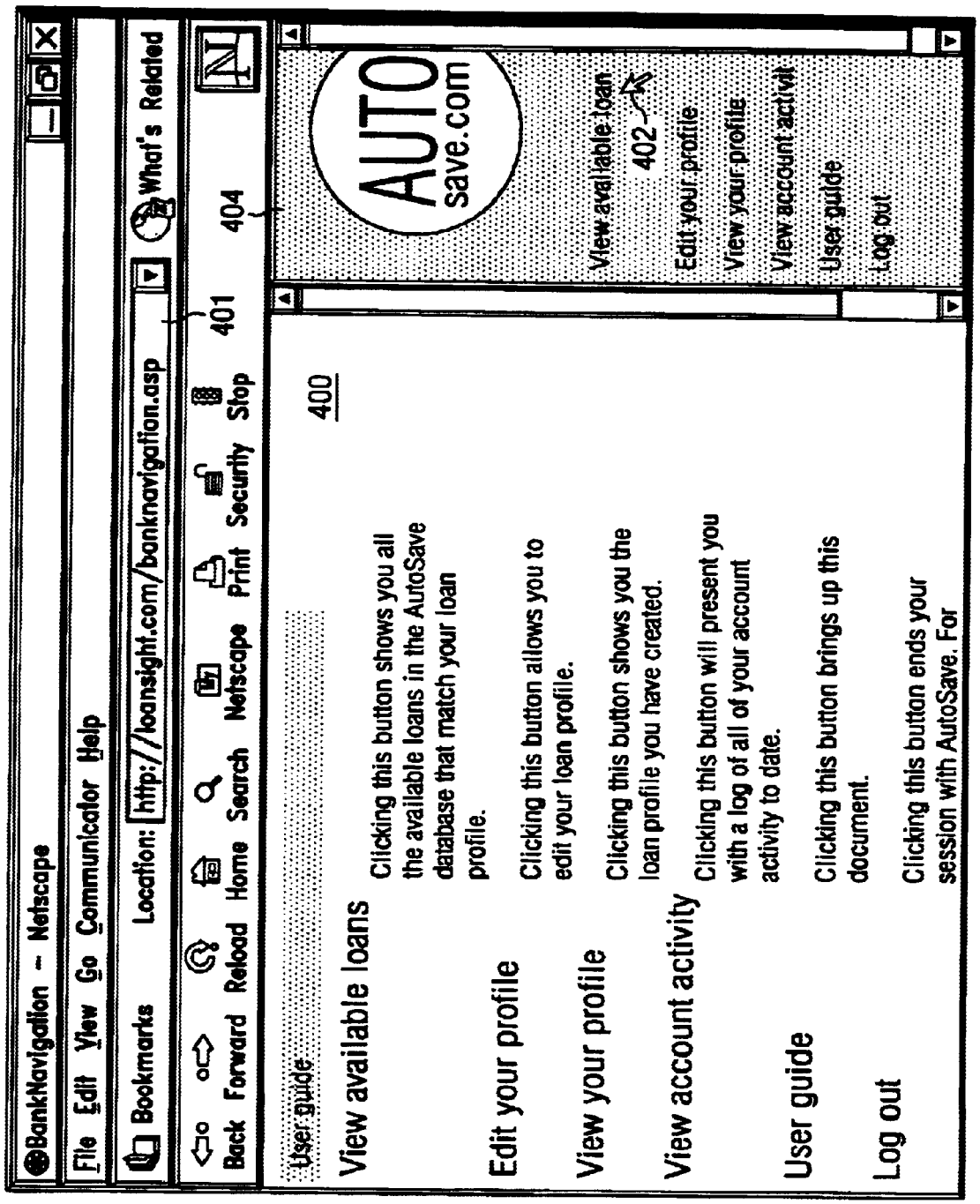
FIG. 4a is an illustration of a 1st screen displayed by a display device of a bank of the system of FIG. 1.
Figure 9A:
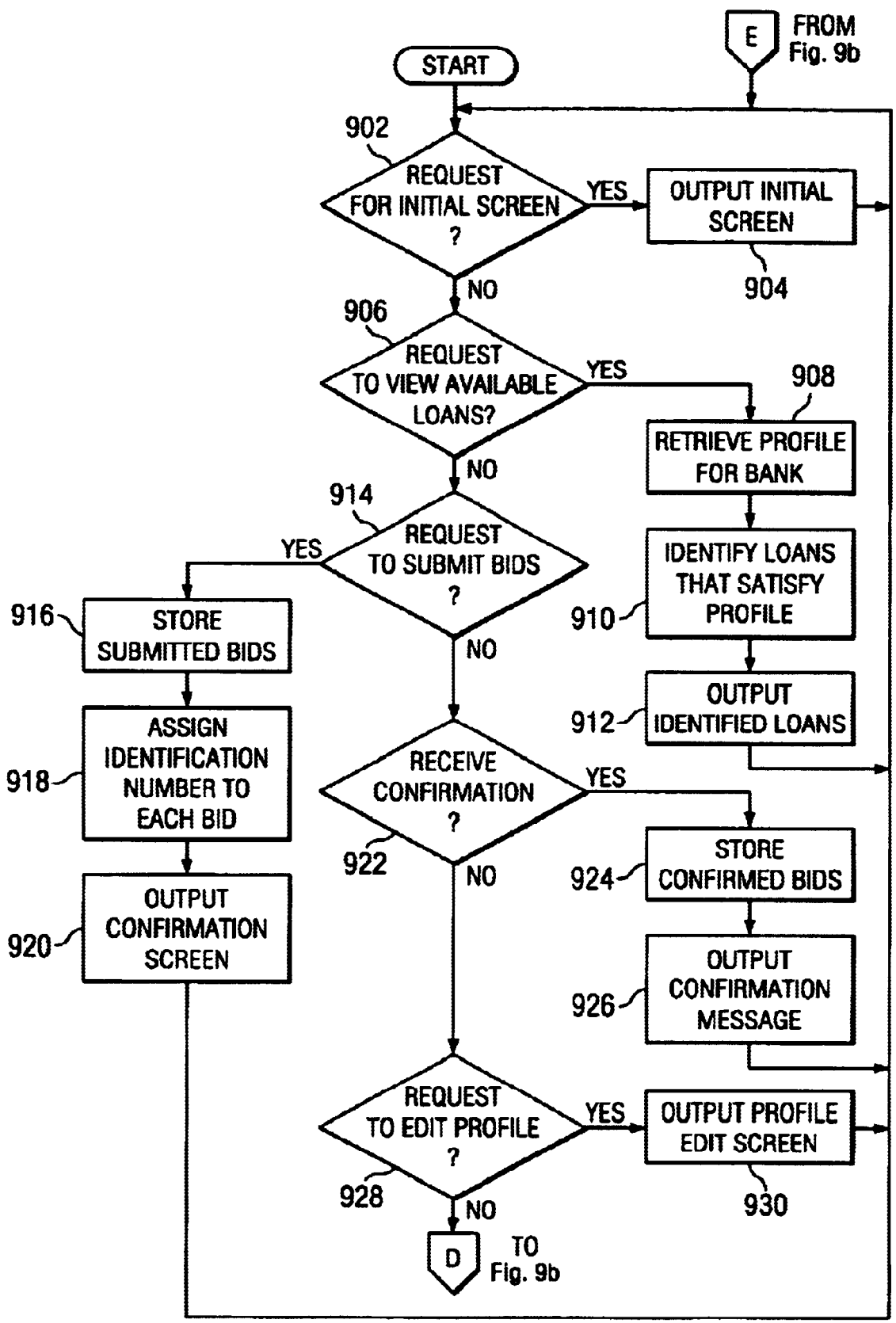
Figure 9B:
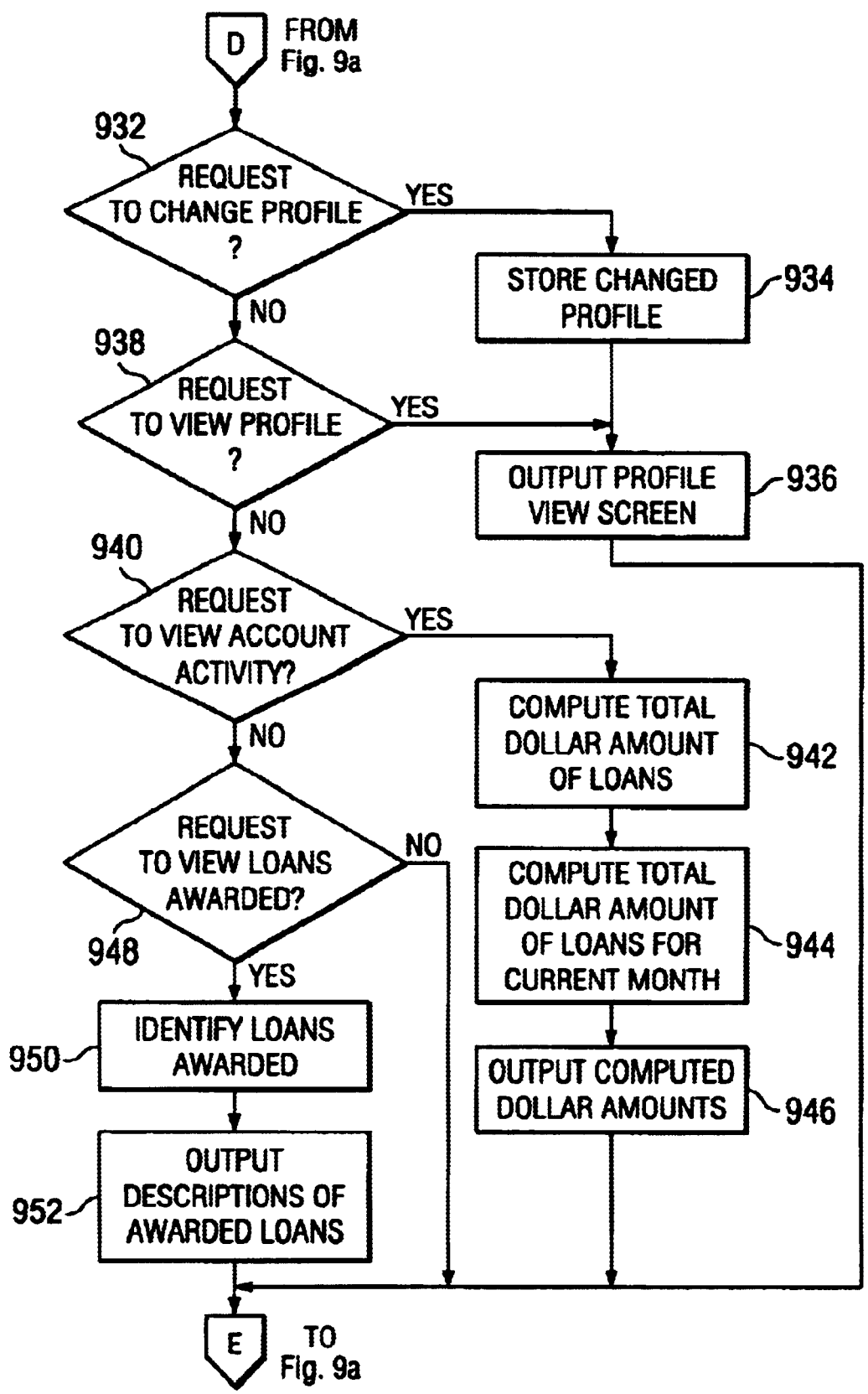

FIG. 9 is a flowchart of operation of bank process 508 of FIG. 5, and FIG. 9 shows the sequence and interrelation of such operation's various steps. The following description references FIG. 9, simultaneously with FIGS. 4a–g. FIG. 4a is an illustration of screen 400, displayed by a bank's display device. As indicated in FIG. 4a, the bank's computer (such as computer 204) executes browser software, such as (a) Netscape Navigator software or (b) alternatively, Microsoft Internet Explorer software.

Screen 400 includes a URL field 401, which is a region of screen 400 in which the bank's user (such as user 202) is able to specify a URL address. In FIG. 4a, the user-specified URL address is http://loansight.corn/banknavigation.asp, which defines the route to a file on website server 110. The bank's user specifies the URL address by (a) clicking URL field 401 (e.g. operating the bank's pointing device (such as the pointing device of input devices 206) to position a cursor 402 overlapping with URL field 401 and, after so positioning cursor 302, activating a switch of the bank's pointing device) and (b) typing alphanumeric character information of the URL address for display within URL field 401.

After the bank's user specifies the URL address, the user is able to cause the bank's computer to transmit the URL address to network 112, as for example by pressing an "Enter" key of the bank's electronic keyboard. In response to such transmission of the URL address, network 112 communicates with website server 110 through network router 114. At a step 902, website server 110 detects such communication (which is a request for initial screen 400 of FIG. 4a). In response thereto, at a step 904, website server 110 outputs signals (such as HTML commands or XML commands) to the bank's computer.

Accordingly, through network 112 and network router 114, the bank's computer receives such signals from website server 110. In response thereto, the bank's computer outputs signals to the bank's display device, so that the bank's display device displays screen 400.

As shown in FIG. 4a, screen 400 includes a set of buttons indicated generally at 404, which are regions of screen 400. Each button of screen 400 (e.g. each of buttons 404) is individually clickable by the bank's user. Buttons 404 include a "View available loans" button. In response to the bank's user clicking the "View available loans" button, as shown in FIG. 4a, the bank's computer outputs at least one signal to website server 110.

At a step 906, website server 110 detects such signal. In response thereto, website server 110 (a) at a step 908, retrieves previously stored information of a profile (for which the bank would like to view descriptions of available loans), (b) at a step 910, from the previously stored list of available loans, identifies loans that satisfy the profile, and (c) at a step 912, outputs additional signals (e.g. including descriptions of identified loans that satisfy the profile) to the bank's computer, resulting in the display of screen 400 of FIG. 4b by the bank's display device. Such previously stored information is stored in database 512.

Figure 4B:
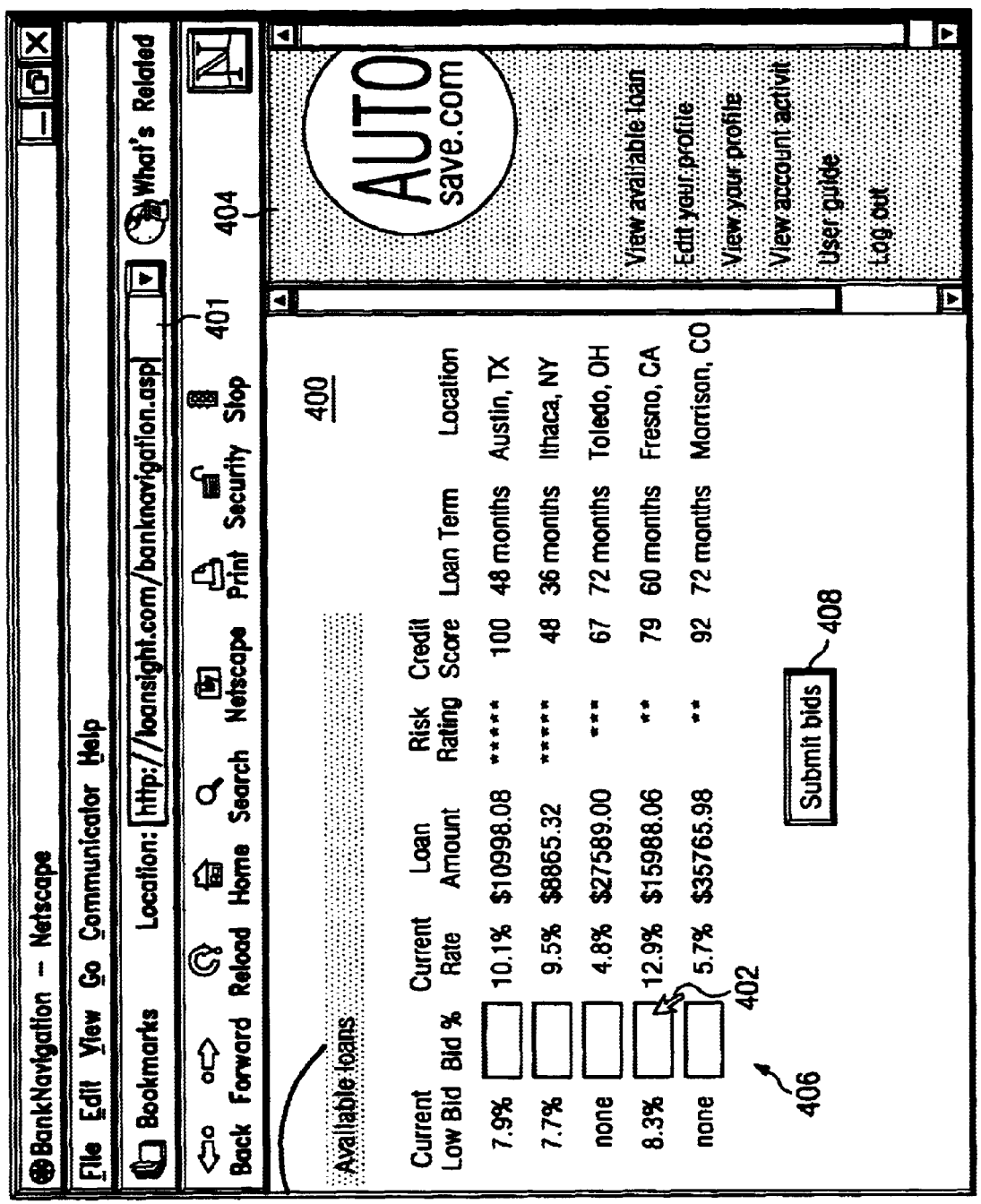
FIG. 4b is an illustration of a 2nd screen displayed by a display device of a bank of the system of FIG. 1.

Accordingly, referring to FIG. 4b, screen 400 includes a set of fields indicated generally at 406. As shown in FIG. 4b, fields 406 are regions of screen 400 in which the bank's user is able to specify numeric character information. Each field (of fields 406) is associated with a respective customer's user (i.e. loan applicant).

Adjacent to such field, screen 400 displays information of such loan applicant, such as the applicant's (a) current loan rate of interest, (b) loan amount, (c) risk rating, (d) credit score, (e) loan term (i.e. length of loan repayment period), (f) city, and (g) state. Moreover, in the "Current Low Bid" column adjacent to such field, screen 400 displays the most favorable (i.e. lowest) proposed new loan rate of interest that has thus far been offered (through system 100) for such loan applicant by any one or more of the banks (such as banks 106 and 108). In that manner, the bank's user is able to determine whether (and what magnitude of) a bid is worthwhile to offer for such loan applicant.

In an alternative embodiment, screen 400 of FIG. 4b additionally displays information about the applicant's automobile, such as information that was previously specified by the applicant for display within fields 310 of screen 300 in FIG. 3d.

In a significant aspect of the illustrative embodiment, website server 110 withholds the loan applicant's specific identity from the bank until after the bank has submitted (through system 100) the most favorable bid (e.g. from among bids submitted by one or more banks, the bid having the lowest proposed new loan rate of interest for refinancing the applicant's loan). In place of the loan applicant's specific identity, website server I 10 shares the applicant's credit score, risk rating, and city/state with the bank. In that manner, each of credit bureaus 122, 124 and 126 reviews the loan applicant's credit history once, as contrasted with once per bank. In that manner, system 100 substantially avoids (a) a temptation for numerous banks to solicit the loan applicant's permission for such banks to request (from the credit bureaus) additional reviews of the applicant's credit history, and (b) the resulting unreasonable damage (such as a negative "Beacon" score consequence) that might be inflicted on the applicant's credit history as a result of such reviews.

In response to viewing the information displayed by screen 400 adjacent to fields 406, the bank's user is able to determine whether a bid is worthwhile to refinance the loan of a particular applicant. If the bank's user determines that such a bid is worthwhile, the bank's user is able to offer a proposed new loan rate of interest by specifying the proposed new loan rate of interest in the field (of fields 406) associated with the particular applicant. Likewise, the bank's user is able to offer proposed new loan rates of interest by specifying the proposed new loan rates of interest in additional fields (of fields 406) associated with additional customers, respectively. The proposed new loan rates of interest specified in fields 406 can be the same as, or different from, one another.

After specifying a proposed new loan rate of interest in one or more of fields 406, the bank's user is able to click a "Submit bids" button 408. In response to the user clicking "Submit bids" button 408, the bank's computer outputs the user-specified information (of fields 406) to website server 110.

At a step 914, website server 110 detects such user-specified information, which is a request to submit bids. In response to receiving the user-specified information, website server 110 (a) at a step 916, stores it (in database 512), (b) at a step 918, assigns an identification number to each bid, and (c) at a step 920, outputs additional signals (e.g. including the identification number) to the bank's computer, resulting in the display of confirmation screen 400 of FIG. 4c by the bank's display device.

Figure 4C:
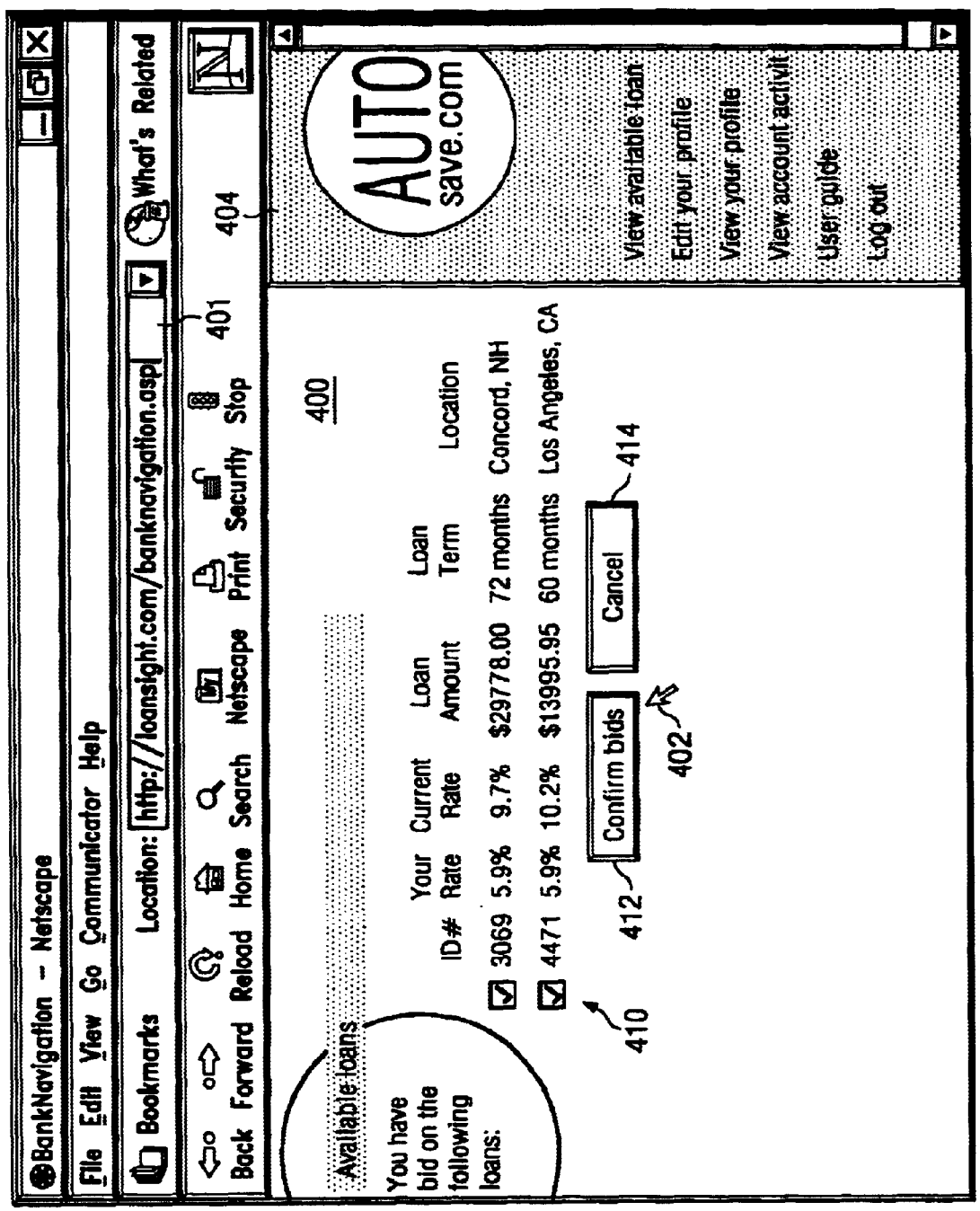
FIG. 4c is an illustration of a 3rd screen displayed by a display device of a bank of the system of FIG. 1.

Accordingly, referring to FIG. 4c, confirmation screen 400 includes a set of fields indicated generally at 410. As shown in FIG. 4c, fields 410 are regions of screen 400 in which the bank's user is able to click to confirm bids. Each field (of fields 410) is associated with a respective bid. Adjacent to such field, screen 400 displays information of such bid, such as the bid's (a) identification number, (b) proposed new loan rate of interest, (c) current loan rate of interest, (d) loan amount, (e) loan term (i.e. length of loan repayment period), and (f) city/state of loan applicant (i.e. the customer's user who is applying for the loan).

In response to viewing the information displayed by screen 400 adjacent to fields 410, the bank's user is able to determine whether each bid is accurate and still worthwhile. If the bank's user determines that a particular bid is accurate and still worthwhile, the bank's user is able to click the field (of fields 410) associated with the bid.

After clicking one or more of fields 410, the bank's user is able to click a "Confirm bids" button 412 in order to confirm the bids associated with the clicked ones of fields 410. Alternatively, the bank's user is able to click a "Cancel" button 414 if the bank's user determines that none of the bids is accurate and worthwhile. In response to the user clicking "Confirm bids" button 412, as shown in FIG. 4c, the bank's computer outputs the user-specified information (i.e. identification of the confirmed bids) to website server 110.

At a step 922, website server 110 detects such user-specified information. In response to receiving the user-specified information (i.e. identification of the confirmed bids), website server 110 (a) at a step 924, stores it (in database 512), and removes unconfirmed bids from database 512, and (b) at a step 926, outputs additional signals to the bank's computer, resulting in the display of screen 400 of FIG. 4d by the bank's display device. Accordingly, referring to FIG. 4d, screen 400 displays a confirmation message that thanks the bank's user for using system 100.

Figure 4D:
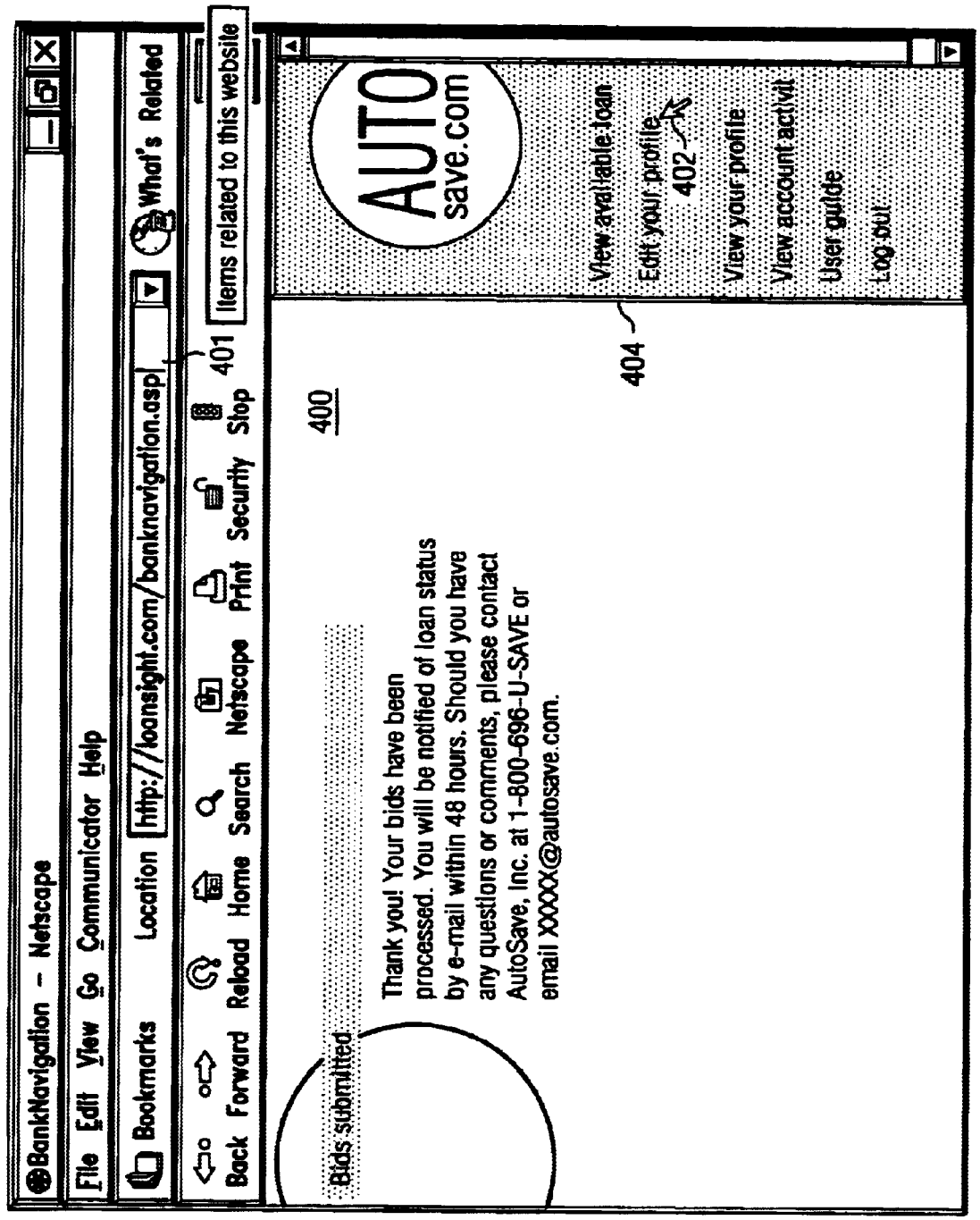
FIG. 4d is an illustration of a 4th screen displayed by a display device of a bank of the system of FIG. 1.
Figure 4E:
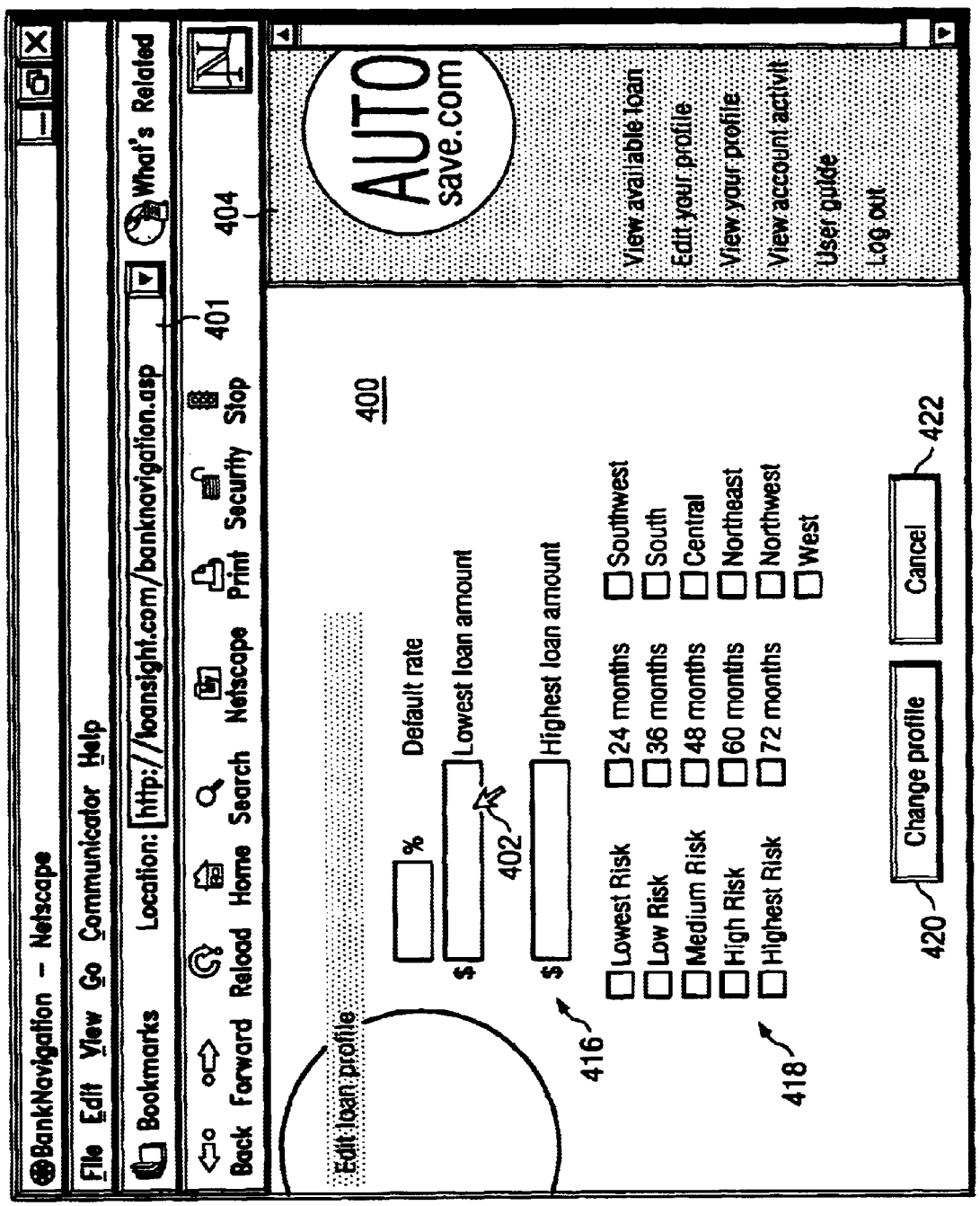
FIG. 4e is an illustration of a 5th screen displayed by a display device of a bank of the system of FIG. 1.

Referring again to buttons 404, in response to the bank's user clicking the "Edit your profile" button (of buttons 404), as shown in FIG. 4d, the bank's computer outputs at least one signal, resulting in a display of screen 400 of FIG. 4e by the bank's display device. In one example, the bank's computer outputs such signal to website server 110. In such example, at a step 928, website server 110 detects such signal. In response thereto, at a step 930, website server 110 outputs additional signals to the bank's computer, resulting in the display of screen 400 of FIG. 4e by the bank's display device.

Accordingly, referring to FIG. 4e, screen 400 includes a first set of fields indicated generally at 416 and a second set of fields indicated generally at 418. As shown in FIG. 4e, fields 416 are regions of screen 400 in which the bank's user is able to specify information of a profile, such as default loan rate of interest offered by the bank. In response to the default loan rate of interest received from the bank and other banks of system 100, website server 110 determines a lowest available new loan rate of interest, as discussed further hereinabove in connection with savings calculator 312 of FIGS. 3e and 3f, and step 726 of FIG. 7.

Also, the bank's user is able to specify a loan amount profile by specifying information in the following fields: (a) lowest loan amount, and (b) highest loan amount. Such lowest and highest loan amounts specify a range of loan amounts for which the bank would like to view descriptions of available loans, as for example in response to clicking the "View available loans" button (as discussed further hereinabove in connection with FIG. 4b). Similarly, with continued reference to FIG. 4e, fields 418 are regions of screen 400 in which the bank's user is able to click to further specify information of a profile (for which the bank would like to view descriptions of available loans).

For example, the bank's user is able to specify a credit score/risk rating profile by clicking one or more of the following fields: (a) lowest risk, (b) low risk, (c) medium risk, (d) high risk, and (e) highest risk, which are categories of the credit score and risk rating discussed further hereinabove. Also, the bank's user is able to specify a loan term profile by clicking one or more of the following fields: (a) 24 months, (b) 36 months, (c) 48 months, (d) 60 months, and (e) 72 months. Moreover, the bank's user is able to specify a geographic profile by clicking one or more of the following fields: (a) Southwest, (b) South, (c) Central, (d) Northeast, (e) Northwest, and (f) West, which designate various regions of the United States in which a loan applicant might reside.

After specifying information of the profile (for which the bank would like to view descriptions of available loans), the bank's user is able to click a "Change profile" button 420 in order to confirm the specified information. Alternatively, the bank's user is able to click a "Cancel" button 422 if the bank's user decides not to change the profile. In response to the user clicking "Change profile" button 420, the bank's computer outputs the user-specified information of the profile to website server 110.

At a step 932, website server 110 detects such user-specified information. In response to receiving the user-specified information of the profile, website server 110 (a) at a step 934, stores it (in database 512), and (b) at a step 936, outputs additional signals to the bank's computer, resulting in the display of screen 400 of FIG. 4f by the bank's display device. Accordingly, referring to FIG. 4e, screen 400 displays the user-specified information of the profile.

Similarly, in response to the bank's user clicking the "View your profile" button (of buttons 404), the bank's computer outputs at least one signal to website server 110. At a step 938, website server 110 detects such signal. In response thereto, website server 110 outputs additional signals to the bank's computer at step 936, resulting in the display of screen 400 of FIG. 4f by the bank's display device.

Figure 4F:
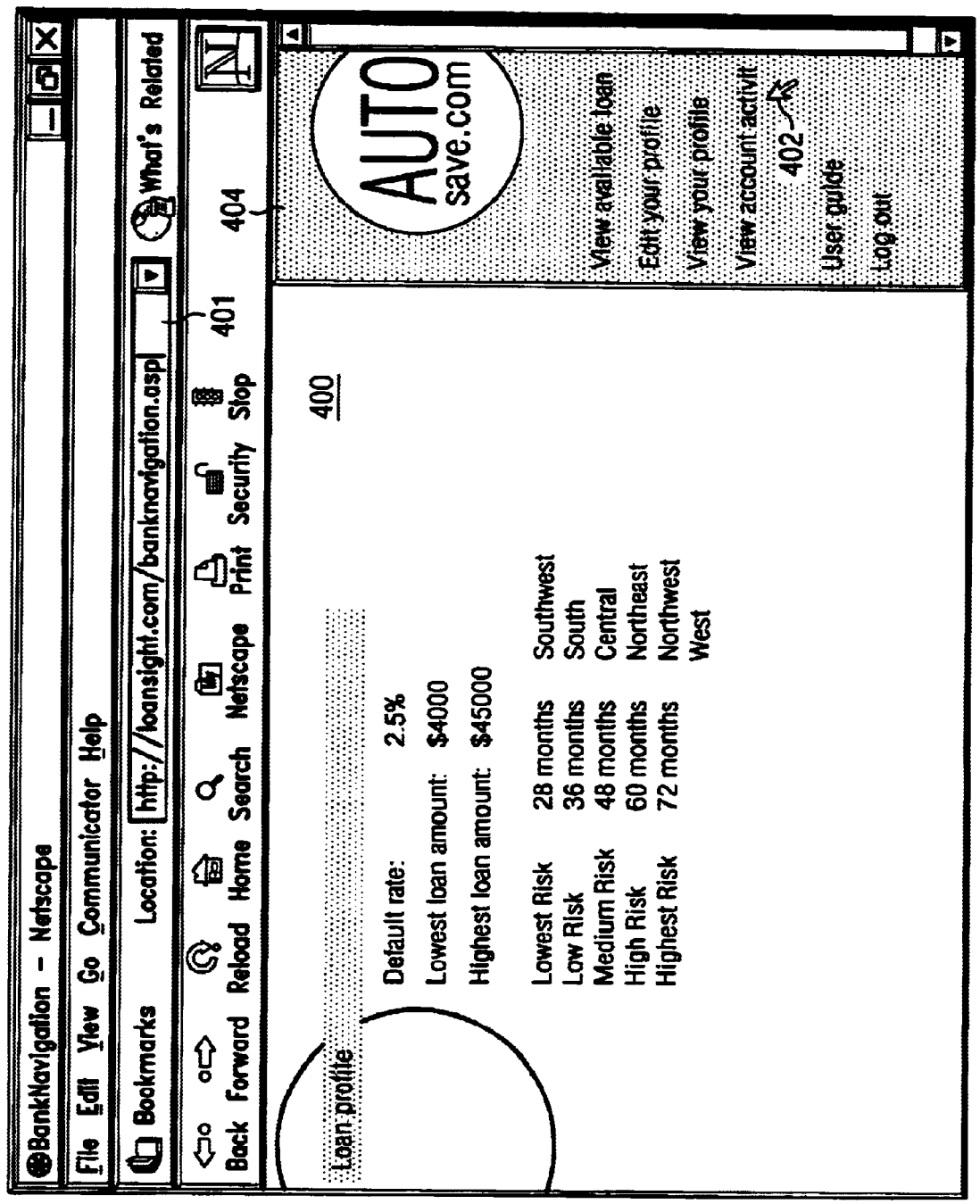
FIG. 4f is an illustration of a 6th screen displayed by a display device of a bank of the system of FIG. 1.

In the example of FIG. 4f, the profile indicates the default loan rate of interest offered by the bank is 2.5%, and the bank would like to view descriptions of available loans between $4,000 and $45,000, of all risks, all loan terms, and all regions of the United States. Referring again to buttons 404, in response to the bank's user clicking the "View account activity" button (of buttons 404), as shown in FIG. 4f, the bank's computer outputs at least one signal to website server 110.

At a step 940, website server 110 detects such signal. In response thereto, website server 110 (a) at a step 942, computes the total dollar amount of loans for which the bank has submitted bids through system 100, (b) at a step 944, computes the total dollar amount of loans for which the bank has submitted bids through system 100 during the current month, and (c) at a step 946, outputs additional signals (e.g. including such computed dollar amounts) to the bank's computer, resulting in the display of screen 400 of FIG. 4g by the bank's display device.

Figure 4G:
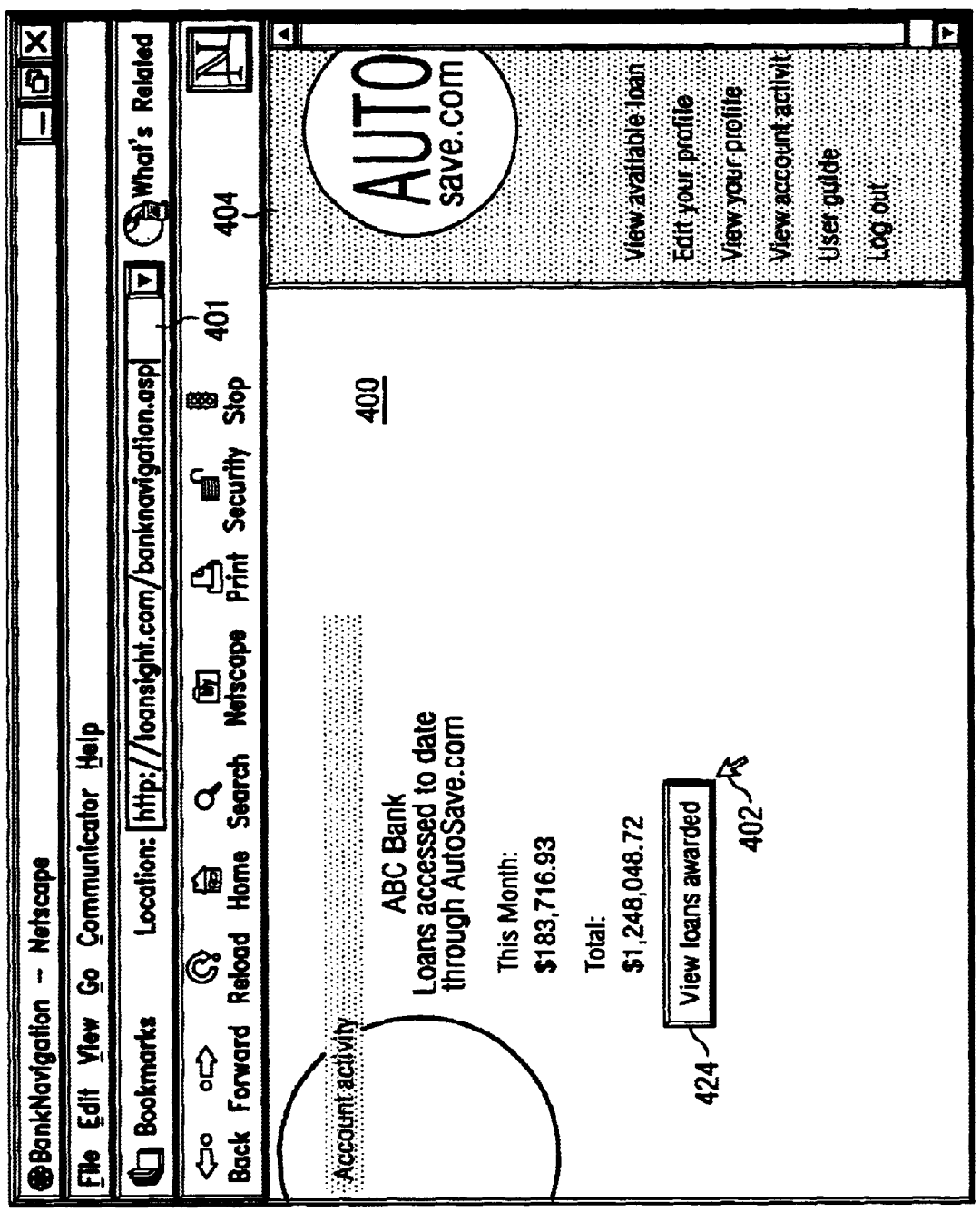
FIG. 4g is an illustration of a 7th screen displayed by a display device of a bank of the system of FIG. 1.

Accordingly, referring to FIG. 4g, screen 400 displays such computed dollar amounts. Similarly, in response to the bank's user clicking a "View loans awarded" button 424, as shown in FIG. 4g, the bank's computer outputs at least one signal to website server 110.

At a step 948, website server 110 detects such signal. In response thereto, website server 110 (a) at a step 950, identifies each loan for which the bank has submitted the most favorable bid through system 100, as most recently identified by website server 10 as discussed further hereinbelow in connection with FIG. 10, and (b) at a step 952, outputs additional signals (e.g. including descriptions of such loans) to the bank's computer, resulting in a display of such descriptions on screen 400 by the bank's display device.

Figure 10:
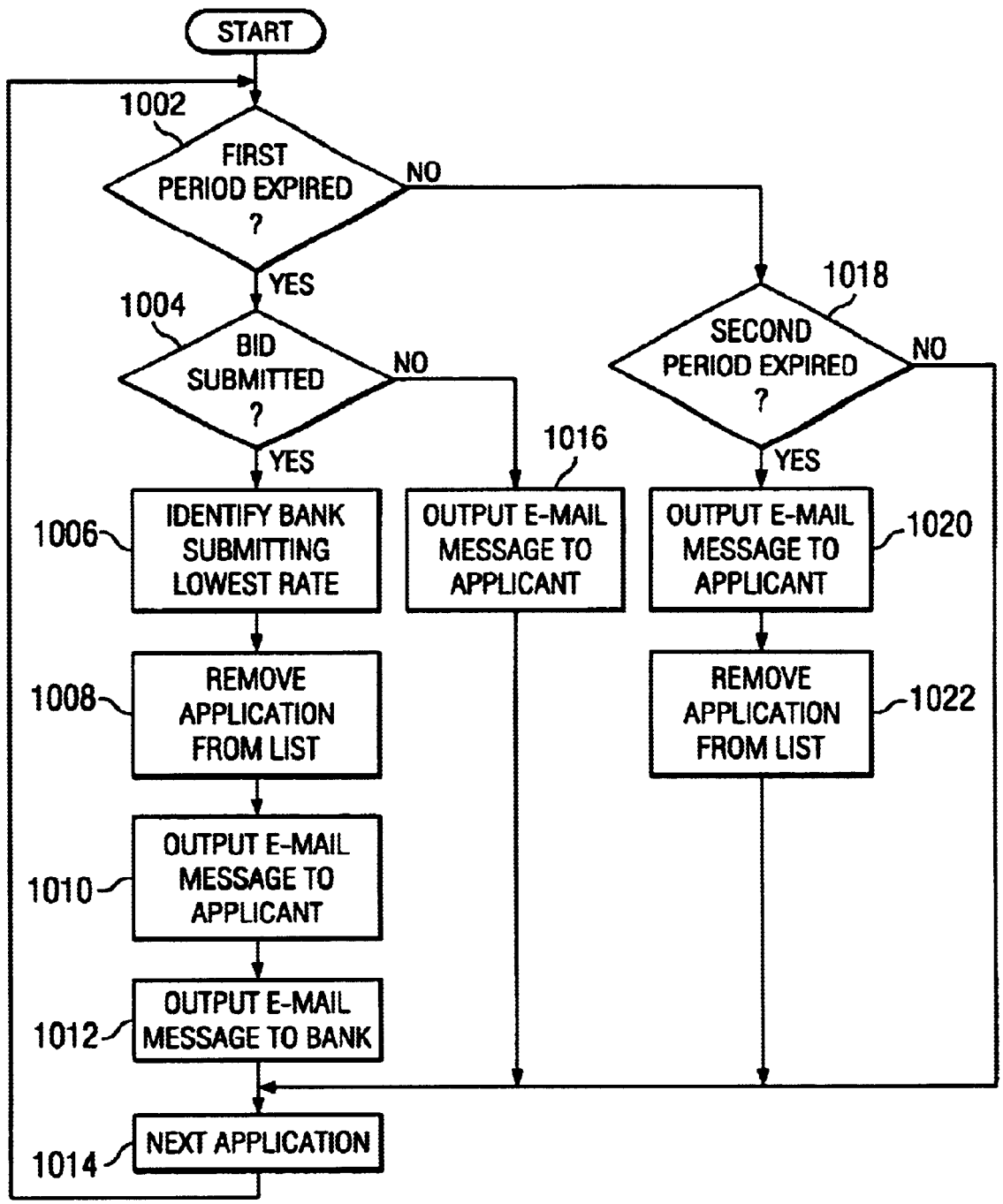
FIG. 10 is a flowchart of operation of a notification process of FIG. 5.

FIG. 10 is a flowchart of operation of notification process 510 of FIG. 5, and FIG. 10 shows the sequence and interrelation of such operation's various steps. In the illustrative embodiment, for a period of up to three (3) business days after a loan applicant completes submission of an application for a new loan (i.e. by clicking "Continue" button 322 of FIG. 3h), website server 110 continues storing a description of such application in the list of available loans, so that numerous banks are able to submit respective bids for the application's loan during such period.

Accordingly, at a step 1002, website server 110 determines whether a first period of one (1) business day has expired for a particular loan's application. If website server 110 determines that such first period has expired, the operation continues to a step 1004. At step 1004, website server 110 determines whether a bank has submitted a bid for the particular loan through system 100. If a bank has submitted such a bid, the operation continues to a step 1006.

At step 1006, website server 110 identifies (a) at least one bank's respectively submitted bid as being most favorable (most favorable bid) and (b) each bank which submitted such most favorable bid. Website server 110 identifies each such bank from among the banks that submitted respective bids for the particular loan before the expiration of such first period of one (1) business day. In a significant aspect of the illustrative embodiment, by identifying each such 110 bank from among the potentially numerous banks that submitted respective bids, website server 110 advantageously assists the loan applicant who might otherwise be compelled to personally identify each such bank by inefficiently reviewing numerous (perhaps hundreds or thousands) of bids.

Notably, before the expiration of such period, it is possible for multiple banks to submit respective bids having the same lowest proposed new loan rate of interest for refinancing the same loan (i.e. the same most favorable terms). In that situation, according to one embodiment, at step 1006, website server 110 identifies a single bank (from among such multiple banks) that first submitted such bid. In that manner, website server 110 motivates such multiple banks to promptly submit their respective bids.

After website server 110 identifies the single bank at step 1006, the operation continues to a step 1008. At step 1008, website server 110 removes the loan application's description from the list of available loans, which is stored by website server 110 in database 512. After step 1008, the operation continues to a step 1010.

At step 1010, website server 110 outputs an e-mail message to the loan applicant with information (a) notifying such applicant that such bank has submitted the most favorable bid, (b) specifically identifying such bank, and (c) disclosing such bank's proposed terms (e.g. new loan rate of interest). After step 1010, the operation continues to a step 1012.

At step 1012, website server 110 outputs an e-mail message to such bank with information (a) notifying such bank that it submitted the most favorable bid of interest, and (b) specifically identifying the loan applicant. After step 1012, the operation continues to a step 1014, where website server 110 identifies a next particular loan's application. For such next particular loan, the operation returns to step 1002, and the operation of FIG. 10 is repeated for such next particular loan.

By specifically identifying the loan applicant to only the identified bank, system 100 substantially avoids the discomfort which might otherwise be inflicted on the loan applicant as a result of numerous banks unnecessarily receiving such information. For example, if numerous banks unnecessarily receive such information, the loan applicant might be inundated with uninvited correspondence and personal solicitation from such banks, at least some of which may solicit the applicant's permission for such banks to request (from the credit bureaus) additional reviews of the applicant's credit history. This advantage of system 100 is especially noteworthy in situations where hundreds or thousands of banks (such as bank 106) access system 100 of the illustrative embodiment.

For similar reasons, in one embodiment, if a bank submits (through system 100) a bid for refinancing the applicant's loan, and if such bid has the most favorable terms for refinancing the applicant's loan, the bank is contractually committed to (a) promptly offer such terms (e.g. proposed new loan rate of interest) directly to the applicant and (b) maintain such offer to the applicant for a contractually specified time period before such offer expires. In such embodiment, the contractual commitment and contractually specified time period are evidenced in a written agreement between the bank and the organization that operates website server 110. In that manner, system 100 (a) substantially avoids a situation in which the bank submits a bid (e.g. having the lowest proposed new loan rate of interest) merely for the purpose of receiving the applicant's specific identity and (b) achieves efficiency and reliability for loan applicants who use system 100.

After receiving the bank's offer to refinance the applicant's loan at the proposed new rate of interest, the applicant is free to (a) accept such offer, (b) reject such offer, or (c) allow such offer to expire without response by the applicant. Accordingly, in auctioning the loan through system 100 of the illustrative embodiment, the applicant is the offeree of the bid, as contrasted with being the offeror of the bid. For example, in auctioning the loan through system 100 of the illustrative embodiment, the banks submit respective bids without knowing a loan rate of interest that would be acceptable to the applicant. Moreover, in a significant aspect of the illustrative embodiment, if a bank submits a bid, the applicant is free to reject such bid without obligation or financial penalty.

In one embodiment, if the applicant chooses to accept the bank's offer, the bank is permitted to require underlying evidence of the applicant's credit score and risk rating that were displayed to the bank in FIG. 4b. For example, the bank is permitted to request, as a condition for refinancing the applicant's loan, the applicant's permission for the bank to receive a copy of the applicant's credit history. Accordingly, upon receiving such permission from the applicant, the bank is able to request that one or more of credit bureaus 122, 124 and 126 (a) perform a review of the user's credit history, with reference to a database stored on the credit bureau's hard disk, and (b) disclose the detailed results of such review to the bank. If such results are consistent with the applicant's credit score and risk rating that were displayed to the bank in FIG. 4b, then the bank is contractually committed to refinance the applicant's loan at the proposed new rate of interest.

Referring again to step 1004, if website server 110 determines that no bank has submitted a bid for the particular loan through system 100, the operation continues to a step 1016. At step 1016, website server 110 outputs an e-mail message to the loan applicant, notifying such applicant: (a) that no bank has submitted a bid; and (b) that website server 110 will continue storing the loan application's description in the list of available loans for a second period of two (2) business days. After step 1016, the operation continues to step 1014.

Referring again to step 1002, if website server 110 determines that the first period of one (1) business day has not expired for the particular loan, the operation continues to a step 1018. At step 1018, website server 110 determines whether the second period of two (2) business days has expired for the particular loan. If website server 110 determines that such period of two (2) business days has not expired for the particular loan, the operation continues to step 1014.

Conversely, if website server 110 determines at step 1018 that the second period of two (2) business days has expired for the particular loan, the operation continues to a step 1020. At step 1020, website server 110 outputs an e-mail message to the loan applicant, notifying such applicant: (a) that no bank has submitted a bid; and (b) that website server 110 will remove the loan application's description from the list of available loans, which is stored by website server 110 in database 512. After step 1020, the operation continues to a step 1022, where website server 110 performs such removal. After step 1022, the operation continues to step 1014.

Referring again to FIG. 2, computer-readable medium 212 is a floppy diskette. Computer-readable medium 212 and computer 204 are structurally and functionally interrelated with one another as described further hereinbelow. Each computing device of the illustrative embodiment is structurally and functionally interrelated with a respective computer-readable medium, similar to the manner in which computer 204 is structurally and functionally interrelated with computer-readable medium 212. In that regard, computer-readable medium 212 is a representative one of such computer-readable media, including for example but not limited to storage device 211.

Computer-readable medium 212 stores (or encodes, or records, or embodies) functional descriptive material (e.g. including but not limited to software (also referred to as computer programs or applications) and data structures). Such functional descriptive material imparts functionality when encoded on computer-readable medium 212. Also, such functional descriptive material is structurally and functionally interrelated to computer-readable medium 212.

Within such functional descriptive material, data structures define structural and functional interrelationships between such data structures and computer-readable medium 212 (and other aspects of computer 204, computing system 200 and system 100). Such interrelationships permit the data structures' functionality to be realized. Also, within such functional descriptive material, computer programs define structural and functional interrelationships between such computer programs and computer-readable medium 212 (and other aspects of computer 204, computing system 200 and system 100). Such interrelationships permit the computer programs' functionality to be realized.

For example, computer 204 reads (or accesses, or copies) such functional descriptive material from computer-readable medium 212 into the memory device of computer 204, and computer 204 performs its operations (as described elsewhere herein) in response to such material which is stored in the memory device of computer 204. More particularly, computer 204 performs the operation of processing a computer application (that is stored, encoded, recorded or embodied on a computer-readable medium) for causing computer 204 to perform additional operations (as described elsewhere herein). Accordingly, such functional descriptive material exhibits a functional interrelationship with the way in which computer 204 executes its processes and performs its operations.

Further, the computer-readable medium is an apparatus from which the computer application is accessible by computer 204, and the computer application is processable by computer 204 for causing computer 204 to perform such additional operations. In addition to reading such functional descriptive material from computer-readable medium 212, computer 204 is capable of reading such functional descriptive material from (or through) network 112 which is also a computer-readable medium (or apparatus). Moreover, the memory device of computer 204 is itself a computer-readable medium (or apparatus).

Although illustrative embodiments have been shown and described, a wide range of modification, change and substitution is contemplated in the foregoing disclosure and, in some instances, some features of the embodiments may be employed without a corresponding use of other features. For example, although the illustrative embodiments have been shown and described in connection with refinancing a loan, the illustrative embodiments are equally applicable to the financing of an original loan for purchase of an item.

Moreover, although the illustrative embodiments have been shown and described in connection with the auctioning of a loan (e.g. in a situation where the customer wants to identify a vendor that offers a lowest available rate of interest for the customer to purchase such loan), the illustrative embodiments are equally applicable to the auctioning of any other product or service (e.g. in a situation where the customer wants to identify a vendor that offers a lowest available price for the customer to purchase such product or service). Accordingly, it is appropriate that the appended claims be construed broadly and in a manner consistent with the scope of the embodiments disclosed herein.

What is claimed is:

1. A method performed by a computing device, the method comprising:

receiving first information about a customer;

to at least first and second loan sources, outputting second information enabling the first and second loan sources to determine whether to offer a loan to the customer for financing an item, including at least a portion of the first information;

from the first and second loan sources, receiving submissions of respective first and second offers for providing the loan to the customer for financing the item, the first and second offers being submitted by the first and second loan sources in response to the second information and in a manner that commits to provide the loan if accepted by the customer;

identifying at least one of the first and second offers as being most favorable;

to the customer, outputting third information about the identified offer, including an identity of at least one of the loan sources that submitted the identified offer.

2. The method of claim 1 wherein receiving first information comprises receiving the first information including information about the item, and wherein outputting second information comprises outputting the second information including the information about the item.

3. The method of claim 1 wherein receiving submissions comprises:

receiving the submissions of the first and second offers for providing the loan to the customer for financing the item, the item being an automobile.

4. The method of claim 1 wherein receiving submissions comprises:

receiving the submissions of the first and second offers for providing the loan to the customer for financing the item, the item being security for the loan.

5. The method of claim 1 wherein receiving first information comprises receiving the first information including an identity of the customer, and wherein outputting second information comprises outputting the second information yet withholding the customer's identity.

6. The method of claim 5 and comprising:

outputting the customer's identity to the identified loan source.

7. The method of claim 1 and comprising:

in response to the first information, determining fourth information regarding the customer's ability to repay the loan, the second information including the fourth information.

8. The method of claim 7 wherein determining fourth information comprises:

in response to the first information, outputting at least one request to a credit bureau;

from the credit bureau, receiving at least one reply to the request; and in response to the reply, determining the fourth information.

9. The method of claim 1 and comprising:

in response to the first information, determining a measure of certainty regarding the customer's identity in comparison to the first information.

10. The method of claim 1 wherein outputting second information comprises:

outputting the second information about the customer only if the measure of certainty regarding the customer's identity is higher than a predetermined threshold.

11. The method of claim 10 wherein determining regarding the customer's identity comprises:

in response to the first information, outputting at least one first request to a credit bureau;

from the credit bureau, receiving at least one first reply to the first request;

in response to the first reply, determining at least one second request;

outputting the second request to the customer in order to authenticate the customer's identity in comparison to the first information:

from the customer, receiving at least one second reply to the second request; and in response to the second reply, determining the measure of certainty regarding the customer's identity in comparison to the first information.

12. The method of claim 1 wherein receiving submissions comprises:

receiving the submissions of the respective first and second offers for providing the loan to the customer for financing the item, the first and second offers being submitted by the first and second loan sources in a manner that commits to provide the loan if accepted by the customer within a specified time period.

13. The method of claim 1 wherein receiving submission comprises:

receiving the submissions of the respective first and second offers for providing the loan to the customer for financing the item, the first and second offers being submitted by the first and second loan sources in a manner that commits to provide the loan if accepted by the customer, and if the second information is consistent with a review of underlying evidence thereof.

14. A method performed by a computing device, the method comprising:

receiving first information about a customer, including an identity of the customer;

in response to the first information, determining second information regarding the customer's ability to repay a loan;

to at least one loan source, outputting third information enabling the loan source to determine whether to offer the loan to the customer for financing an item, including at least a portion of the first information and the second information, yet withholding the customer's identity;

from the loan source, receiving a submission of an offer for providing the loan to the customer for financing the item, the offer being submitted by the loan source in response to the third information and in a manner that commits to provide the loan if accepted by the customer;

to the customer, outputting fourth information about the offer, including an identity of the loan source.

15. The method of claim 14 wherein receiving first information comprises receiving the first information including information about the item, and wherein outputting third information comprises outputting the third information including the information about the item.

16. The method of claim 14 and comprising:

outputting the customer's identity to the loan source after receiving the submission of the offer from the loan source.

17. The method of claim 14 wherein determining second information comprises:

in response to the first information, outputting at least one request to a credit bureau;

from the credit bureau, receiving at least one reply to the request; and in response to the reply, determining the second information.

18. The method of claim 14 and comprising:

in response to the first information, determining a measure of certainty regarding the customer's identity in comparison to the first information.

19. The method of claim 18 wherein outputting third information comprises:

outputting the third information about the customer only if the measure of certainty regarding the customer's identity is higher than a predetermined threshold.

20. The method of claim 19 wherein determining a measure of certainty regarding the customer's identity comprises:

in response to the first information, outputting at least one first request to a credit bureau;

from the credit bureau, receiving at least one first reply to the first request;

in response to the first reply, determining at least one second request;

outputting the second request to the customer in order to authenticate the customer's identity in comparison to the first information;

from the customer, receiving at least one second reply to the second request; and in response to the second reply, determining the measure of certainty regarding the customer's identity in comparison to the first information.

21. The method of claim 14 wherein receiving the submission comprises:

receiving the submission of the offer for providing the loan to the customer for financing the item, the item being an automobile.

22. The method of claim 1 wherein receiving submissions: comprises:

receiving the submissions of the respective first and second offers for providing the loan to the customer for refinancing the item.

23. The method of claim 7 wherein determining fourth information comprises:

determining the fourth information including a measure of certainty regarding the customer's ability to repay the loan.

24. The method of claim 14 wherein receiving the submission comprises:

receiving the submission of the offer for providing the loan to the customer for refinancing the item.

25. The method of claim 14 wherein determining second information comprises:

determining the second information including a measure of certainty regarding the customer's ability to repay the loan.

26. The method of claim 14 wherein receiving the submission comprises:

receiving the submission of the offer for providing the loan to the customer for financing the item, the item being security for the loan.

27. The method of claim 14 wherein receiving the submission comprises:

receiving the submission of the offer for providing the loan to the customer for financing the item, the offer being submitted by the loan source in a manner that commits to provide the loan if accepted by the customer within a specified time period.

28. The method of claim 14 wherein receiving the submission comprises:

receiving the submission of the offer for providing the loan to the customer for financing the item, the offer being submitted by the loan source in a manner that commits to provide the loan if accepted by the customer, and if the third information is consistent with a review of underlying evidence thereof.

* * * * *

UNITED STATES PATENT AND TRADEMARK OFFICE
CERTIFICATE OF CORRECTION

PATENT NO. : 6,622,131 B1  
DATED : September 16, 2003  
INVENTOR(S) : Brown et al.

It is certified that error appears in the above-identified patent and that said Letters Patent is hereby corrected as shown below:

<u>Title page, Item [54] and Column 1, lines 1-2,</u>
Title, delete "METHOD AND SYSTEM FOR AUCTIONING LOANS THROUGH A COMPUTING SYSTEM" and insert thereof -- METHOD AND SYSTEM FOR OFFERING A LOAN THROUGH A COMPUTING SYSTEM --.

Signed and Sealed this

Tenth Day of February, 2004

JON W. DUDAS
*Acting Director of the United States Patent and Trademark Office*